May 26, 1953 B. LIEBOWITZ 2,639,841
METHOD AND APPARATUS FOR MAKING COLLARS
Filed March 5, 1949 11 Sheets-Sheet 1
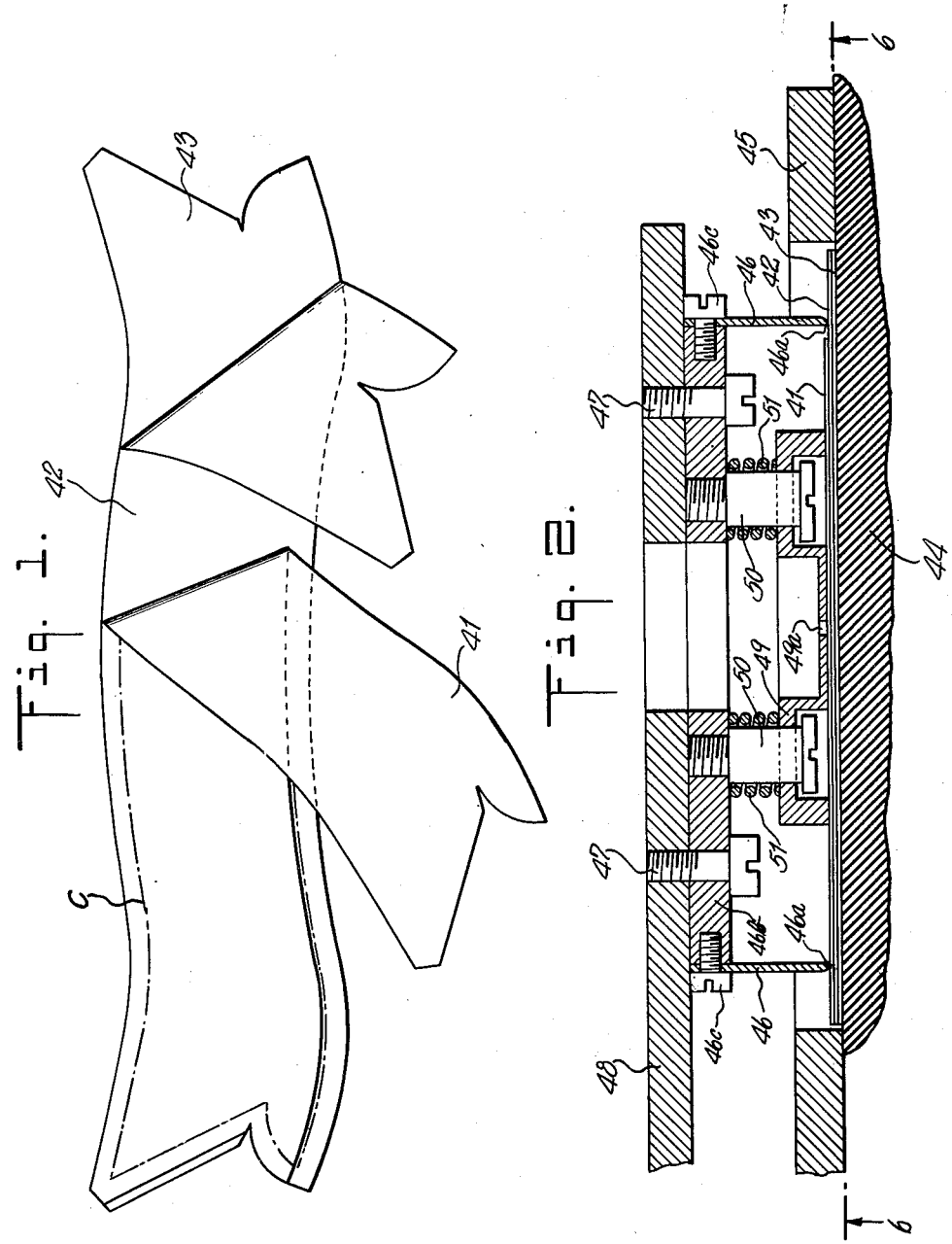
INVENTOR.
BENJAMIN LIEBOWITZ
BY Kenyon & Kenyon
ATTORNEYS May 26, 1953   B. LIEBOWITZ   2,639,841
METHOD AND APPARATUS FOR MAKING COLLARS
Filed March 5, 1949   11 Sheets-Sheet 2

INVENTOR.
BENJAMIN LIEBOWITZ
BY
Kenyon & Kenyon
ATTORNEYS

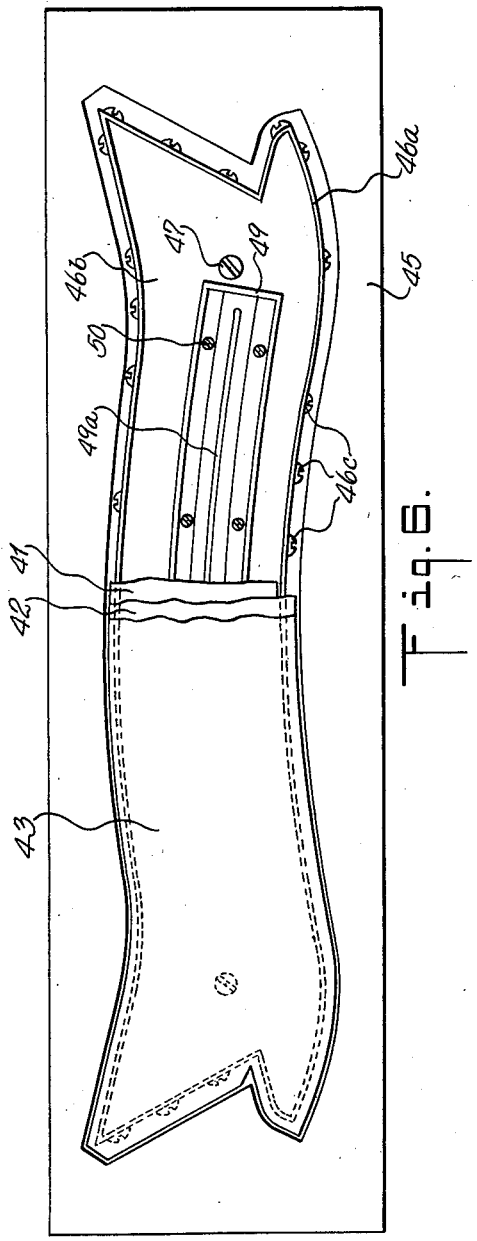
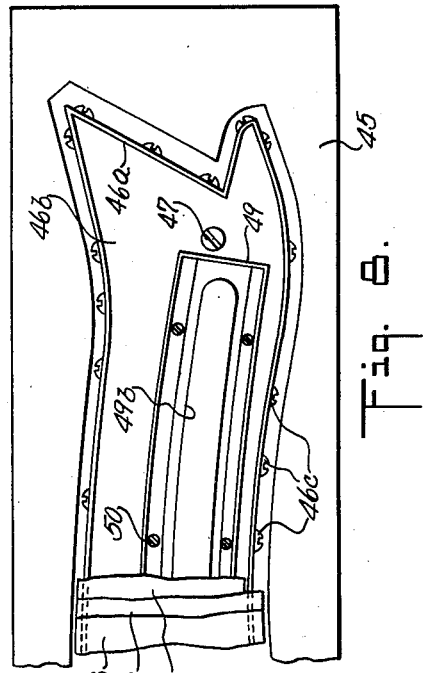
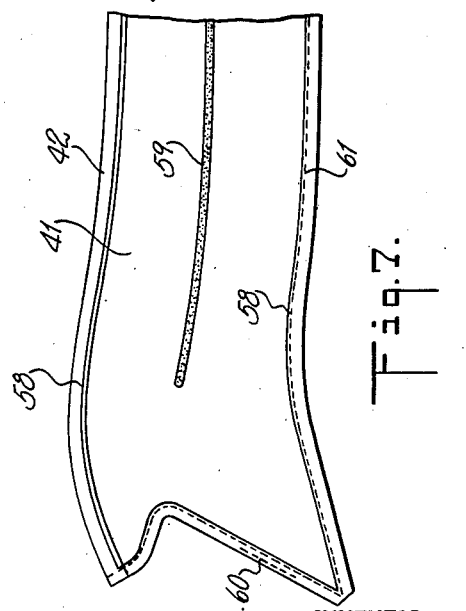

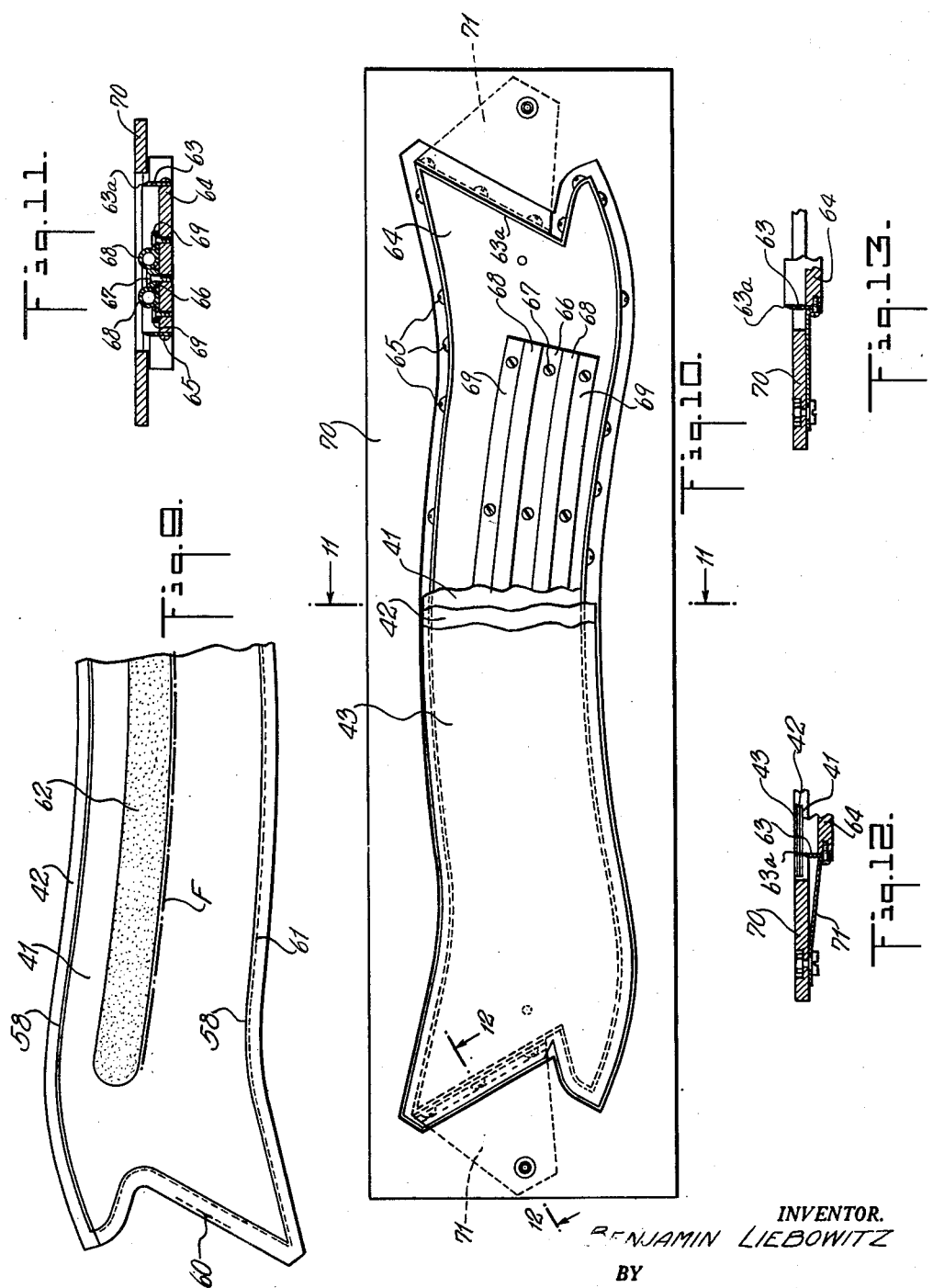

May 26, 1953 B. LIEBOWITZ 2,639,841
METHOD AND APPARATUS FOR MAKING COLLARS
Filed March 5, 1949 11 Sheets-Sheet 5
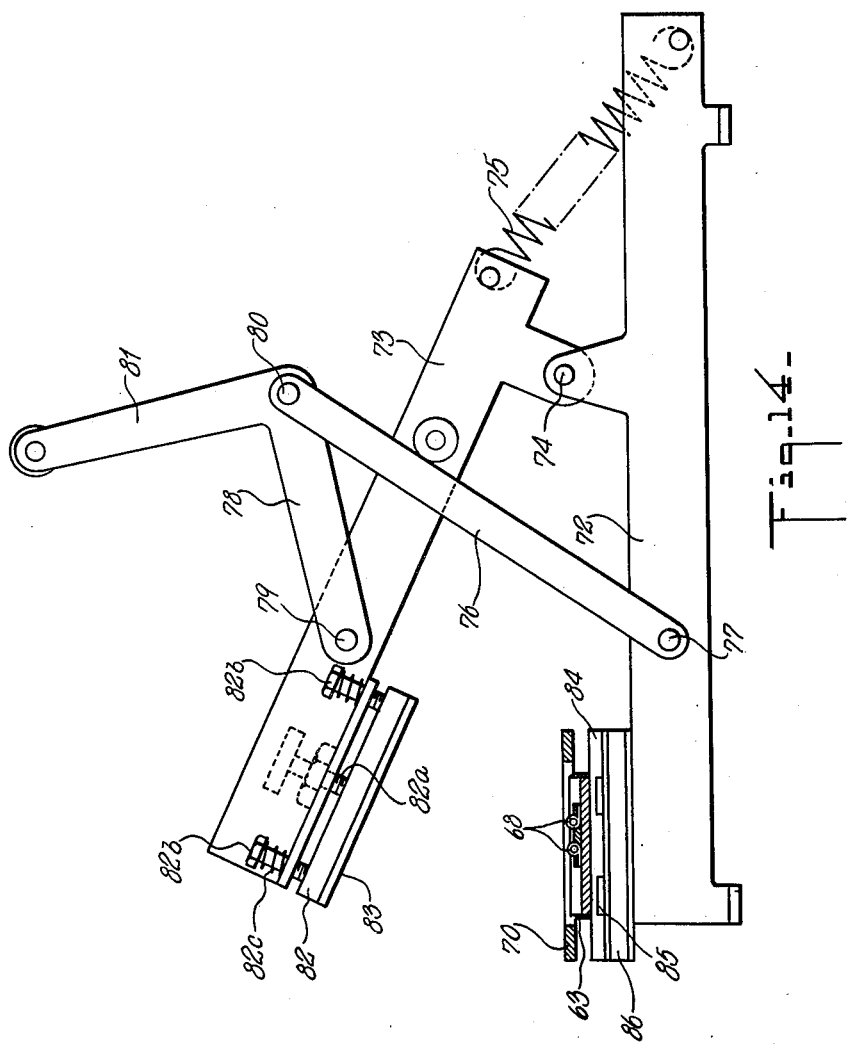
INVENTOR.
BENJAMIN LIEBOWITZ
BY
Kenyon & Kenyon
ATTORNEYS May 26, 1953 B. LIEBOWITZ 2,639,841
METHOD AND APPARATUS FOR MAKING COLLARS
Filed March 5, 1949 11 Sheets-Sheet 6

INVENTOR.
BENJAMIN LIEBOWITZ
BY
Kenyon & Kenyon
ATTORNEYS

May 26, 1953 B. LIEBOWITZ 2,639,841
METHOD AND APPARATUS FOR MAKING COLLARS
Filed March 5, 1949 11 Sheets-Sheet 7
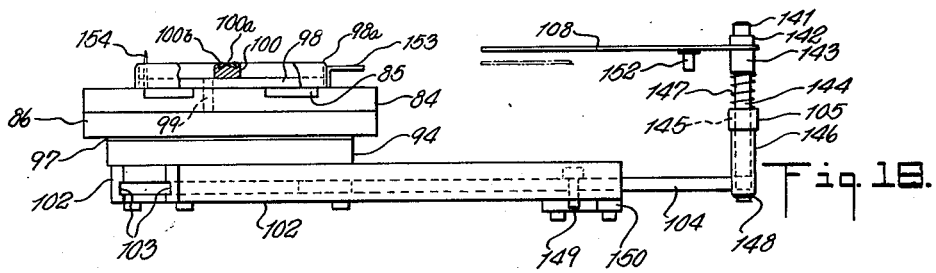
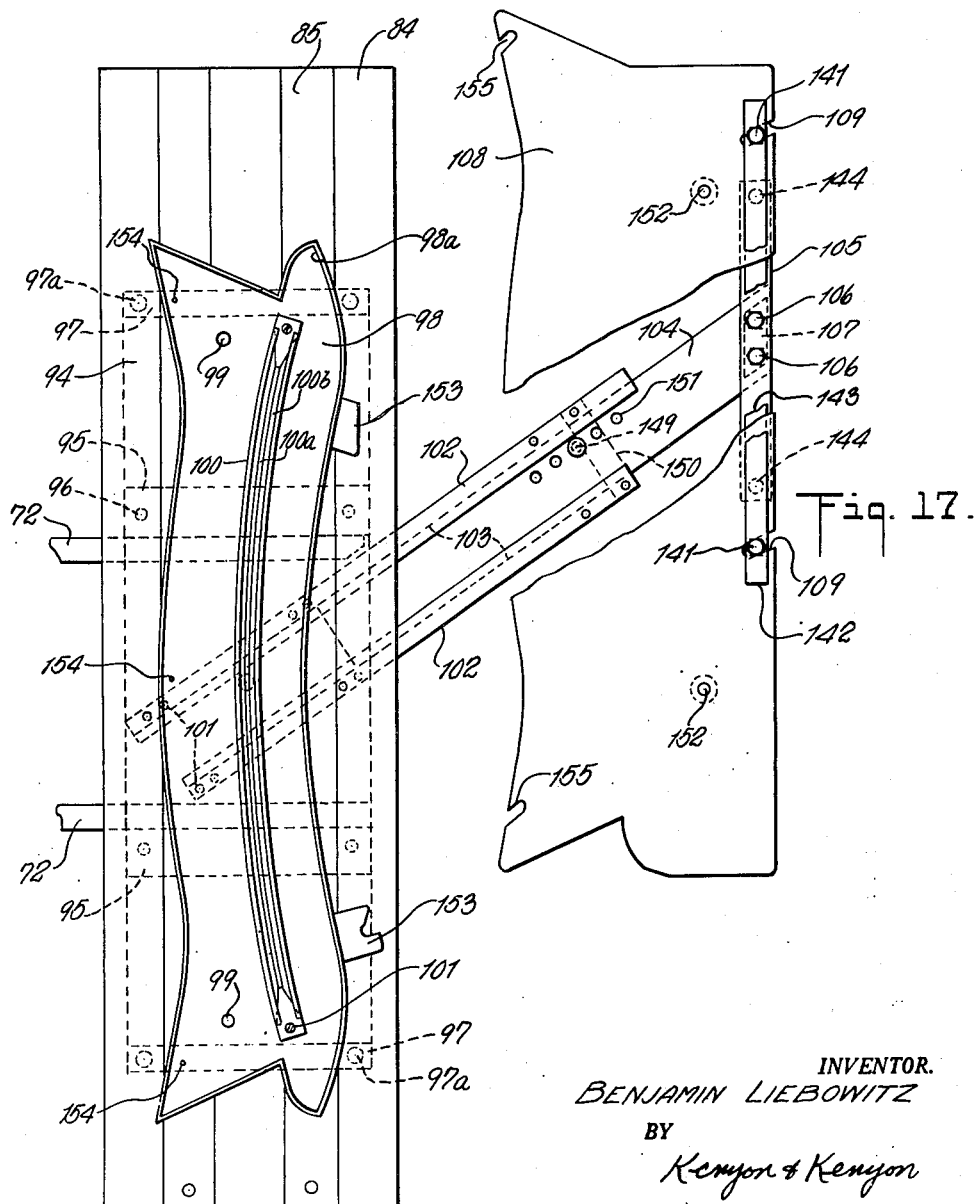
INVENTOR.
BENJAMIN LIEBOWITZ
BY
Kenyon & Kenyon
ATTORNEYS May 26, 1953
B. LIEBOWITZ
2,639,841
METHOD AND APPARATUS FOR MAKING COLLARS
Filed March 5, 1949
11 Sheets-Sheet 8
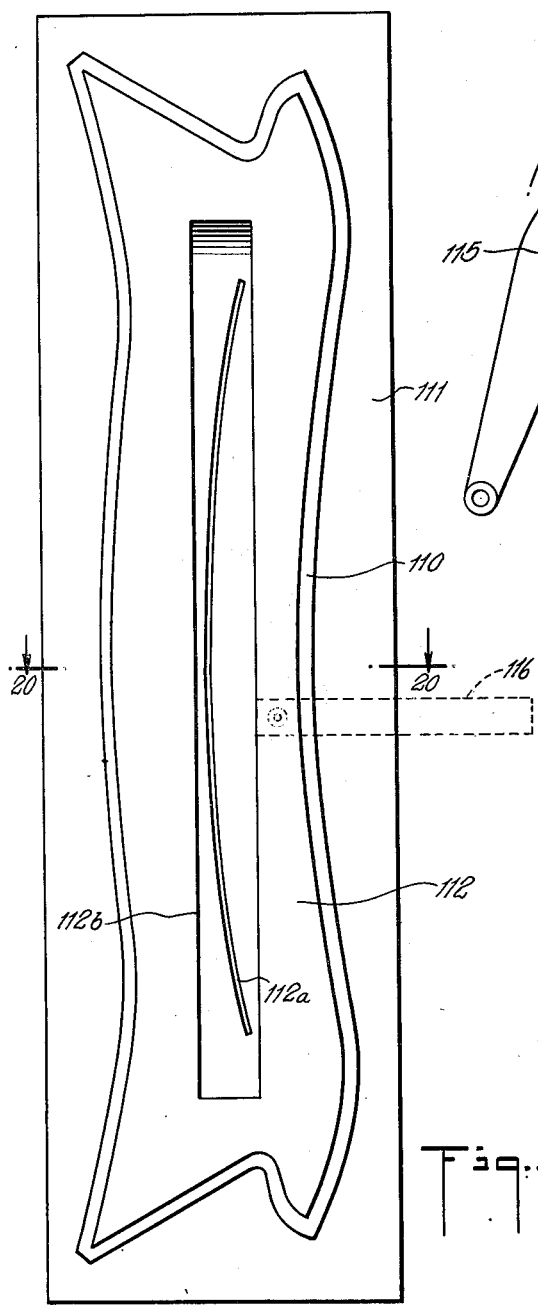
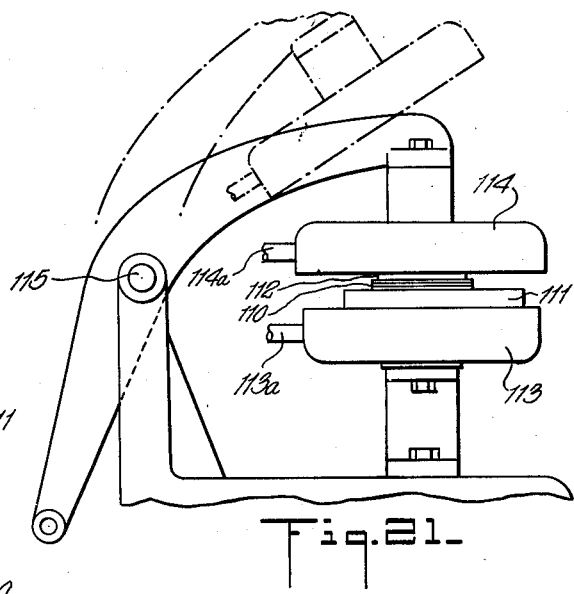
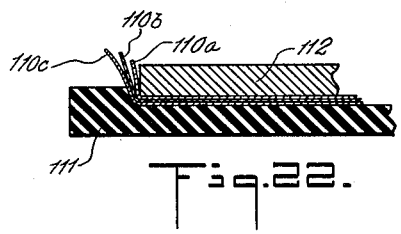
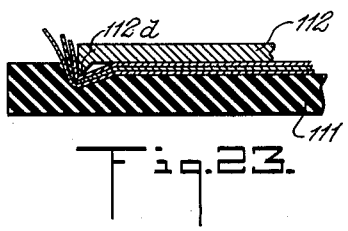
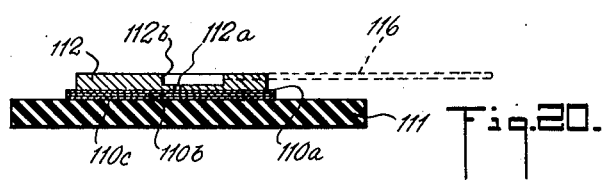
INVENTOR.
BENJAMIN LIEBOWITZ
BY
Kenyon & Kenyon
ATTORNEYS May 26, 1953  B. LIEBOWITZ  2,639,841
METHOD AND APPARATUS FOR MAKING COLLARS
Filed March 5, 1949  11 Sheets-Sheet 9
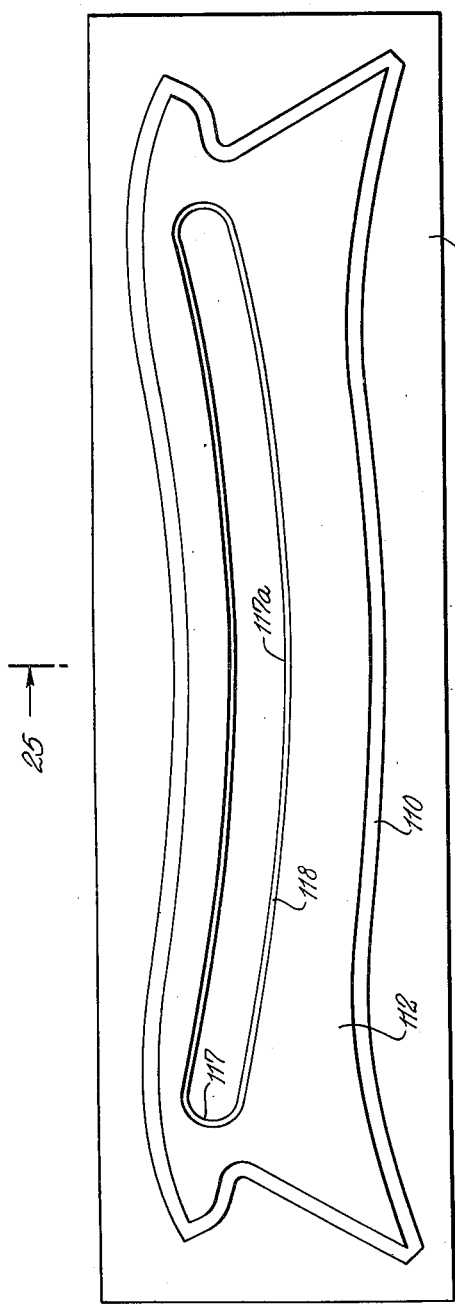
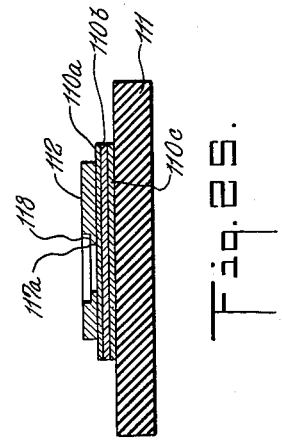
INVENTOR.
BENJAMIN LIEBOWITZ
BY
Kenyon & Kenyon
ATTORNEYS May 26, 1953   B. LIEBOWITZ   2,639,841
METHOD AND APPARATUS FOR MAKING COLLARS
Filed March 5, 1949   11 Sheets-Sheet 11

INVENTOR.
BENJAMIN LIEBOWITZ
BY
Kenyon & Kenyon
ATTORNEYS

Patented May 26, 1953

2,639,841

UNITED STATES PATENT OFFICE 2,639,841

METHOD AND APPARATUS FOR MAKING COLLARS

Benjamin Liebowitz, Lewisboro, N. Y., assignor to Trubenizing Process Corporation, New York, N. Y., a corporation of New York Application March 5, 1949, Serial No. 79,758
In Great Britain January 16, 1947

54 Claims. (Cl. 223—2)

This invention relates to the manufacture of articles of apparel, particularly collars and has for its general object to provide an improved method and apparatus for effecting such manufacture. For convenience and brevity the description herein will be confined to collars.

This application is a continuation-in-part of my copending applications, all now abandoned, Serial No. 790,042, filed December 6, 1947, for Apparatus and Method for Collar Creasing; Serial No. 30,814, filed June 3, 1948, for Method and Apparatus for the Manufacture of Collars; and Serial No. 36,974, filed July 3, 1948, for One-Piece Collars and Method and Apparatus for Making Same.

In the generally accepted method of manufacturing conventional collars the foldover or "collartop" portion, as it is usually called, is made up, and the standup or "collarband" portion, as it is usually called, is then applied by stitching its constituting plies to the finished collartop, usually in two or more steps.

The collartop and the collarband usually each consist of three plies of fabric. Thus, at the seam where the collartop is joined to the collarband there are nine plies of fabric, i. e., the three single plies of the collartop and the three plies of the collarband doubled over to hide their raw edges.

This bulky seam is often uncomfortable; moveover, it requires high tensions in stitching and therefore tends to shrink a great deal when the finished collar is laundered. Even more serious is the variability of shrinkage with variations in methods of washing. For example, there is generally a difference in shrinkage of ⅜ or ½ inch as between hand laundering and commercial laundering. Attempts have therefore been made to eliminate this bulky seam by cutting the fabric plies constituting the collar to the shape of the whole collar instead of cutting the collar top and collarband portions separately. Collars cut in this fashion are called "one-piece collars." Except for so-called "sport" collars, where high precision is not demanded, these previous attempts have had little success because manufacturing tolerances have been too large to allow adequate precision in the finished article. These difficulties are also encountered in the manufacture of collars of the two-piece type, although the two-piece structure allows some correction by trimming before banding.

In the manufacture of collars by the usual methods, there is a sequence of operations each involving a substantial tolerance. For example, in cutting, it is practically impossible to hold dimensions closer than plus or minus $\frac{1}{32}''$; likewise in registering; likewise in the first stitching operation, that is the running; and in turning there is an even larger variation due to the inevitable formation of "lips." Without going into details on the actual magnitude of these variations, it may be said that practically no manufacturer today, using current methods, produces collars whose lengths as sewn vary less than plus or minus $\frac{3}{16}''$. One of the primary objects of this invention is the elimination or minimization of these variations and it may be stated at once that I can actually produce collars whose variations come well within plus or minus $\frac{1}{16}''$.

The method of the present invention, although useful in the manufacture of the collartop portions of two-piece collars, is particularly suited to the manufacture of one-piece collars and is, therefore, hereinafter described mainly in its relation to one-piece collars.

These articles, i. e., the one-piece three-ply collars and the tops of ordinary two-piece three-ply collars are normally made by a method called "run and turn," which consists of superimposing the three plies with the face ply in the middle, "running," i. e., stitching around three sides of the outline required of the finished garment and "turning" the assembly inside out thus bringing the face ply to the outside and the interlining ply inside. During turning the plies hinge approximately around the running stitch.

For clarity and convenience the fabric layers of the collar structure are referred to herein as the "face ply," the "lining ply" and the "back ply" respectively.

It is an object of this invention to provide novel method and apparatus whereby the difficulties of the character above mentioned which heretofore have been encountered in the manufacture of collars or the like can successfully be overcome. One of the prime objectives of this invention is to provide method and apparatus whereby collars or the like can readily be manufactured in accurate conformity to predetermined dimensions and contours. It is a further principal objective of this invention to provide method and apparatus whereby collars or the like can readily be manufactured with the foldline thereof accurately determined by foldline-forming means with respect to predetermined finished contours.

A characteristic feature of the invention consists of a new step in the making of a "run and turned" collartop of a two-piece collar or the whole of a one-piece collar, this step consisting of impressing the whole or most of the outline required for the finished collar into at least one of the collar plies (ordinarily the interlining) but preferably into two or all three of the assembled plies, so that when the collar is turned inside out, the plies will hinge accurately on the impression thus made even when the stitching does not conform precisely with this impression. This impression may be made either before or after "running."

Thus, in its broadest aspect the invention consists of a method of making a collar or collartop wherein the plies are assembled and united and turned inside out in accordance with known "run and turn" practice, characterized in that a crease, defining the outline of the collar or collartop, or an essential part thereof, is impressed in at least one of the plies of the assembly along and adjacent the margin or peripheral edge of the collartop portion thereof before turning.

The impression should be such as to facilitate both running and turning, i. e., it should leave a visible mark and predispose or flatten or weaken the yarns or fibers so as to facilitate and insure turning around the line of impression, rather than around the line of stitching. To achieve this result novel creasing means is employed using a crease-forming die which has a relatively sharp crease-forming edge shaped to the contour desired for the collar and which has associated therewith means adapted to press the crease-forming edge into the superposed collar plies backed by a resilient padding.

This step is of particular importance in the making of one-piece collars of the "fused" type where the provision of a properly located and permanent dividing line between collartop and collarband (the so-called "foldline" of the collar) is of primary importance and has proved in the past to be one of the main difficulties in the production of one-piece collars.

The present invention also comprises means whereby this foldline is determined together with the forming of the impression of the collar or collartop outline, either simultaneously or in succession, in such a manner as to insure precise location of the foldline relative to the impressed outline. This is one of the fundamental aspects of the invention and is applicable to "soft" collars as well as the "fused" type. It is by means of this procedure that this invention transcends the limits imposed by the manufacturing tolerances which have hitherto affected collar production, especially one-piece collar production, adversely.

There are two general methods for defining the foldline. One, which is applicable to "fused" collars only, comprises the prevention of fusion between the back ply and lining along an elongated narrow strip which thereby is kept much softer than the other parts of the collar and hence defines a foldline along which the collartop automatically folds after each laundering. The other method comprises application of extra stiffening at least to the band along a zone, which may be fairly wide or even include the entire band, adjacent to the foldover zone so as to create a line of more or less sudden change or discontinuity in stiffness which serves as a permanent guide for folding down the collartop. This last method is also applicable to soft collars. There are other types of foldline-forming means which have some properties of both the above types, as, for example, in the case of a one-piece fused collar wherein resist material is used to prevent fusing along the foldline and the collarband portion is stiffened immediately adjacent the foldline. The form of apparatus to be used according to this invention is determined, at least to some extent, by the kind of foldline-forming means used.

It is indicated above that the crease may be formed in the lining ply alone, but it is preferable to form the crease simultaneously in the lining ply and the face ply superimposed on it or in all three plies. Convenient handling, however, demands that when two or more plies are simultaneously creased, they be attached to one another, either permanently or temporarily, either before the creasing operation or by the creasing operation itself, otherwise when subsequent operations are performed, there is a good chance for the plies to shift relative to one another. One way of attaching the plies together is to perform the running operation or part of the running operation before the creasing operation. This is perhaps the most practicable method and will be discussed later. Another way is to perform the running operation after the creasing operation and either to temporarily unite the plies to be creased before the creasing operation, e. g., by basting or staples, or cause them to become lightly and/or temporarily attached to each other by the creasing operation itself, as will be described.

In the case of soft collars, the linings used generally contain a substantial amount of starch and other fillings, such that by the application of moisture to the region to be creased, the lining ply may become sufficiently adhered to the face ply by the creasing operation to prevent shifting during subsequent operations. In the case of fused collars, a few drops of solvent or plasticizer may be applied at spots spaced along the creasing edge so that when the creasing operation is performed with the aid of heat and pressure, the lining ply and the face ply will adhere to each other at these spots sufficiently for the purposes intended. The cross-sectional shape of the creasing blade of the die may be such as to facilitate this fusion, e. g., by providing a "land." The strong permanent adhesion is subsequently achieved when the collar is completed and "fused" in the well-known manner regardless of the temporary uniting of the plies.

This invention will be more clearly understood by reference to the accompanying diagrammatic drawings in which, Fig. 1 shows in plan a collar assembly consisting of three registered cut plies, two of the plies being partially folded back;

Fig. 2 is a vertical section of one form of a creasing die and resist applicator, the creasing edge being shown in position against the registered cut plies of the collar assembly disposed in gauged location on a resilient backing;

Fig. 6 shows the creasing die and applicator of Fig. 2 as viewed from underneath along the line 6—6 of Fig. 2;

Fig. 7 is a plan view of a portion of the registered cut plies showing a crease therein and resist material applied thereto in positions determined by the crease-forming die and applicator shown in Figs. 2 and 6.

Fig. 8 is a partial view similar to Fig. 6 but showing a modified applicator adapted for the application of stiffening material to the collarband as a foldline-forming means;

Fig. 9 is similar to Fig. 7 but shows stiffening material applied to the collarband in position determined by the applicator shown in Fig. 8;

Fig. 10 is a plan view of a modified creasing die and applicator, the crease-forming edge of the creasing die being upwardly directed and having a registered collar assembly placed thereon;

Fig. 11 is a cross-section on the line 11—11 of Fig. 10;

Fig. 12 is a fragmentary cross-section on the line 12—12 of Fig. 10;

Fig. 13 is the same as Fig. 12 with the parts in different relative positions;

Fig. 14 is a diagrammatic end elevation of a modified crease-forming machine comprising the creasing die and applicator shown in Figs. 10 to 13;

Fig. 17 is a plan view of mechanism generally similar to that shown in Fig. 15, but showing a modification and showing more detail as to mounting the parts with reference to the lower pressure plate of the press shown in Fig. 14;

Fig. 18 is an end view of the parts shown in Fig. 17;

Fig. 19 is a plan view of a modified creasing die and applicator in the form of a template which is shown disposed on a registered collar assembly resting on rubber padding, the template containing a stencil aperture adapted for application of resist material to the assembly;

Fig. 20 is a cross-section taken on the line 20—20 of Fig. 19;

Fig. 21 is an end elevation showing parts of a conventional collar press provided with rubber padding on the lower buck, the collar plies and template shown in Figs. 19 and 20 being in place and being acted upon by the upper head of the press;

Fig. 22 is a fragmentary cross-section showing the template of Figs. 19 to 21 forming a crease;

Fig. 23 is similar to Fig. 22 showing a modification of the template which may be used to improve the crease;

Fig. 24 is similar to Fig. 19 except that the stencil aperture in the template is adapted for application of stiffening material to the collarband;

Fig. 25 is a cross-section taken on the line 25—25 of Fig. 24;

Fig. 26 is a cross-section of a closure member adapted for use with the template shown in Figs. 24 and 25;

Figure 3:
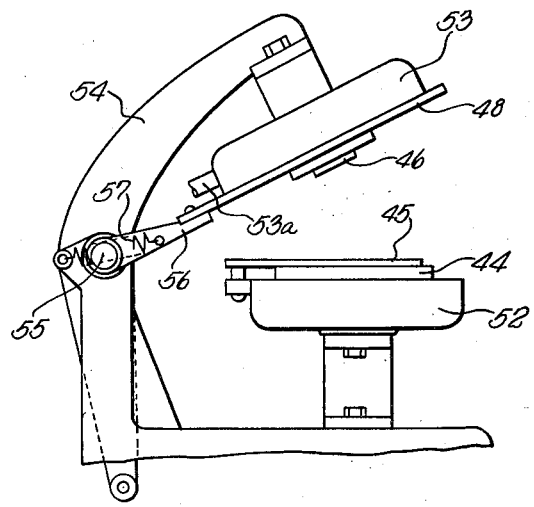
Fig. 3 is a diagrammatic end elevation of a crease-forming machine comprising the creasing die and applicator shown in Fig. 2, the creasing die and applicator being in elevated position.

In Fig. 1 there are shown three layers of fabric cut to form a one-piece collar and intended to be creased along the dot-and-dash line C. The lining ply is indicated by 41, the face ply by 42, and the back ply by 43. The lining ply may be cut narrower than the other two plies as indicated. In Fig. 2 these plies 41, 42 and 43 are shown resting on a resilient pad 44 (e. g. rubber). A gauge plate 45 having an opening corresponding to the cut plies of the collar (see also Fig. 6) also rests on the padding so that the cut plies may be placed in the machine accurately located with respect to the rest of the mechanism by means of said gauge plate 45. A creasing die 46 is shown positioned so as to present creasing edges 46a to the fabric plies. The die may be made by fastening metal strips to a plate 46b as by means of screws 46c, said plate 46b being cut to conform with the required contour of the collar as shown in Fig. 6. By means of screws 47 the die is fastened to a plate 48 by means of which the die is brought into contact with the work. Connected to the die plate 46b is a resist plate 49 held to the die plate 46b by means of studs 50. This resist plate is limited in its movement relative to the plate 46b by the heads of the studs 50 and is urged toward the collar plies by springs 51. When the die 46 is brought into contact with the collar plies, the lower face of the resist plate 49 presses against the uppermost of said plies which in this case is the lining ply 41. The resist plate contains an elongated slot 49a which acts as a stencil aperture through which resist may be applied to the lining ply so that, after the final turning, sewing and fusing operations are completed, adhesion between the back ply and the lining will be prevented along the narrow zone determined by the slot 49a.

Figure 4:
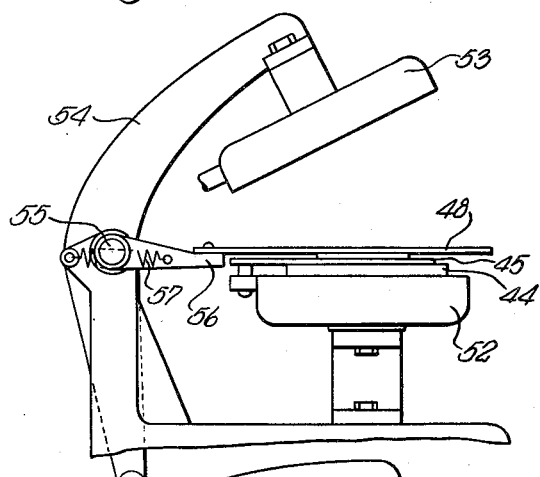
Fig. 4 is the same as Fig. 3 but with the creasing die and applicator in lowered position.
Figure 5:
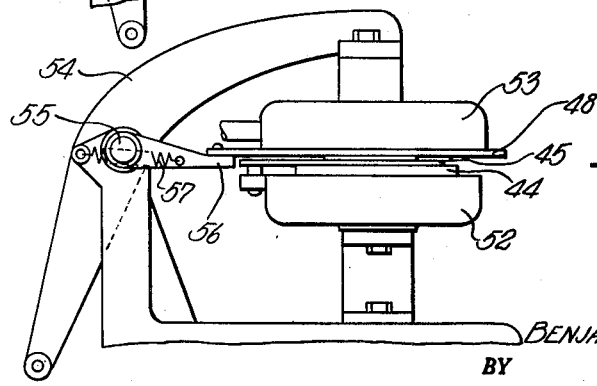
Fig. 5 is the same as Fig. 4 but with the pressing head in lowered position.

The parts illustrated in Fig. 2 may be operated by associating them with a press shown in Figs. 3, 4 and 5. The press comprises a lower buck 52 on which rests the resilient padding 44. Resting on this resilient padding is the gauge plate 45 by means of which the collar parts are located on the press, said gauge plate being held in position by any convenient means as shown. An upper buck 53 which is heated, as by means of the steam inlet 53a, is carried by a lever arm 54 pivotally supported at 55. By appropriate means, e. g., power means not shown, the lever 54 is movable so that the heated head 53 may be moved toward the work. Also pivotally hinged at 55 is an arm 56 which carries the plate 48 to which the die 46 is fastened as shown in Fig. 2. By means of the spring 57 the plate 48 is held either in an upward position in contact with the upper buck 53 or in the lower position shown in Figs. 4 and 5.

The sequence of operations is as follows:

When the press is in the open position shown in Fig. 3 the collar assembly is laid on the resilient pad 44 in a position determined by the gauge plate 45. After the collar assembly is placed in position, the movable plate 48 is lowered into the position shown in Fig. 4, thereby bringing the lower face of the resist plate 49 into contact with the lining ply. Resist is then applied to the lining ply through the slot 49a, the movable plate 48 and the die plate 46b being provided with openings as shown in Fig. 2 for this purpose. After the resist is applied the heated head 53 is lowered onto the work as shown in Fig. 5 thereby applying heat and pressure to the creasing die and forcing the creasing edges 46a into the work, thereby creating the desired crease. It will be noted that in this adaptation, the lining ply is uppermost.

In Fig. 7 the collar assembly is shown after having been subjected to the operations described in the preceding paragraph. By virtue of the action of the creasing edge of the creasing die on the collar assembly the crease 58 is formed in all three plies of the assembly along and adjacent the margin of the foldover portion of the collar and at the end of the collarband, and is formed in the face ply 42 and in the back ply 43 along and adjacent the bottom of the collarband. The resist 59 is applied to the lining ply 41 along a narrow zone at the foldline between the foldover and band portions of the collar, which zone is in accurately spaced relationship to the crease 58. Before performing the operations above described the assembled collar plies may if desired be temporarily held in registration as by basting stitches 60 at each end of the assembly. After the operations above described, the assembly can be run in the usual way along the foldover portion and at the ends of the collarband just outside the crease 59, the running stitch being indicated at 61. After this first stitching operation, trimming operations may be performed at the points of the collar as well as at the "crotch" to remove unwanted fabric in these regions, and then the collar is turned inside out in the usual way, after which the final stitching may be made running parallel to the edge of the collar. When the collar plies are thus turned inside out, thus bringing the lining ply between the top ply and the face ply, the plies will hinge with flexure along the crease, and the outlines of the foldover portion of the collar will have been accurately predetermined by the location of the crease. While the bottom ply will have been creased in the "wrong" direction, experience has shown that the crease in the other two plies dominates and that the bottom ply folds almost automatically in the proper manner when the collar is turned. Moreover after the collar plies have been turned the resist 59 will be accurately located in predetermined spaced relationship with respect to the peripheral contours of the collar as determined by the crease, with the result that when the turned collar is fused by activation of adhesive carried by the lining ply, the resist will prevent fusion of the lining ply with the back ply along the foldline and the collar will fold along the foldline thus defined in accurate relation to the predetermined collar contours.

In Fig. 8 the creasing die and other parts are as hereinabove described in connection with Figs. 1 to 6. The only difference is that in this modification the plate 49 is made somewhat wider so as to accommodate the wider stencil aperture 49b shown in Fig. 8 through which stiffening material may be applied to the collarband with one margin thereof accurately located immediately along the collar foldline. In using the modification shown in Fig. 8, the operations hereinabove described in connection with Figs. 1 to 6 are the same except that instead of applying resist material to the lining ply through the aperature 49a shown in Fig. 6, a stiffening material is applied through the stencil aperture 49b of Fig. 8.

The result of the creasing of the collar plies and the application of stiffening material to the lining is shown in Fig. 9 which is identical with Fig. 7, except that instead of the resist being applied along the collar foldline as shown in Fig. 7, the stiffening material 62 is shown applied to the lining ply along the collarband with one margin thereof immediately adjacent the foldline which is indicated by the dot and dash line at F. When the collar is turned the presence of the stiffening material will afford discontinuity of stiffness along the foldline F which is thereby accurately determined in relation to the finished contours of the collar as predetermined by the crease 58. The practice of the invention employing stiffening material accurately located along the collarband may be in connection with the manufacture either of fused collars or collars of the unfused type, for in either case there will be discontinuity of stiffness accurately located at the collar foldline where the margin of the stiffening material occurs.

Referring to Figs. 10 to 13 a modified die arrangement is shown which is adapted to crease the collar assembly and to locate the foldline by the application of stiffening material to the band in a region adjacent the foldine. In this modification the creasing edge of the creasing die is upwardly directed and the applicator is adapted to apply the stiffening material to the underside of the collar assembly. The creasing die employed may be formed in any suitable way as by fastening strips of metal 63 to the die plate 64 by screws 65. In the region where the collarband is to be stiffened there is a strip of metal 66 which along one margin thereof has the shape of the desired foldline and which may be held to the die plate by screws 67 as indicated. The top of this strip 66 lies about $\frac{1}{16}$" below the creasing edges 63a. A pair of flexible members, which may be tubular as indicated, is shown at 68. These tubular members may be made of an appropriate quality of rubber and are held in position by means of strips 69. The flexible members 68 form a groove into which a strip of material may be placed which will become temporarily or permanently fastened to the lining ply in the creasing operation. Surrounding the die is the gauge plate 70 which may be flexibly fastened to the die by means of flat springs 71, as indicated in Figs. 10, 12 and 13. Also as shown in Fig. 12, the gauge plate 70 is supported so that its upper surface lies above the creasing edges 63a of the die. When pressure is applied so as to force the creasing edges into the work the gauge plate 70 must be able to retract as shown in Fig. 13. The spring mounting at 71 permits this retraction.

One form of press adapted for using the die shown in Figs. 10 to 13 is shown diagrammatically in Fig. 14. It comprises a base member 72 and a hinged member 73 pivoted at 74 and held in a normally up position by spring 75. A toggle mechanism is shown comprising a link 76 hinged to the base member 72 at 77 and a link 78 hinged to the pivoted arm 73 at 79 and hinged to the link 76 at 80. An arm 81 which may be made integral with the link 76 enables the pivoted arm 73 to be raised and lowered as required for the operation. A pressure plate 82 is carried floatingly by the pivoted member 73 by means of screws 82b and springs 82c. Pressure is adjustably applied by means of the centrally located screw 82a. The pressure plate 82 carries the rubber padding 83. The base member 72 carries a pressure plate 84 which is provided with electrical heating elements 85. Heat insulating means may be employed as shown at 86 to restrict the flow of heat from the pressure plate 84 to the base member 72. The creasing die 63 with its associated tubular members 68, etc. and associated gauge plate 70 is placed on the pressure plate 84 in any desired position. It is not necessary to locate the die accurately with respect to other machine parts in this embodiment, because the gauge plate 70 is directly associated with the creasing die. In this embodiment the collar assembly is placed in the gauge 70 with the lining ply 41 down, i. e., next to the creasing edges.

In the embodiment shown in Figs. 10 to 14, the foldline is formed by stiffening the region of the collarband adjacent to it. This may be accomplished in a variety of ways. A preferred form is one in which a strip of fusing lining is used, for example, a strip of lining which contains cellulose derivative yarns; such strips may be cut on the bias and of suitable width to be placed in the slot formed by the tubular members 68. Preferably they are plasticized and allowed to dry before they are inserted into the slot, using, for example, mixtures of dimethyl phthalate and triphenyl phosphate in carbon tetrachloride. When the heated die is brought down so as to impress the crease into the work, heat and pressure are also applied to this added strip so as to unite the same to the lining. The fusion need be only temporary if, as in the case of fused collars, a subsequent fusing operation will be performed so as to permanently unite all the plies. Instead of using a single layer of fabric to stiffen the band, I may use a double layer, formed, for example, by folding over bias strips of double width. Or I may employ a tape containing cellulose derivative yarns or a strip or tape of ordinary fabric coated with an adhesive.

In using the embodiment disclosed in Figs. 10 to 14, the first operation is to place a strip of material of appropriate length and width in the slot formed by the flexible members 68—68, said strip preferably containing latently adhesive material and plasticized, as mentioned. The next step is to register the top ply and the lining and place them in the opening of the gauge plate 70 so that they rest on the creasing edges 63a and on the flexible members 68 and on such additional resilient supports as may be needed to support the plies. A few drops of acetone may then be applied close to the edge of the plies at various points along the collar; the head 82 is then brought down and pressure applied by means of the toggle mechanism 76—77, thereby forcing the creasing edges 63a into the plies backed by the resilient padding 83 and simultaneously pressing on the inserted strip. In a few seconds the crease is formed, the stiffening strip becomes adhered to the lining ply in proper shape and position to determine the location of the foldline, and the face ply and lining become lightly adhered at the spots where the acetone was applied. The press may then be opened and the work removed and the next collar assembly processed. After this creasing operation, the creased lining and face ply are superimposed on the uncreased bottom ply and the three are stitched together with the crease serving as the guide. It is to be emphasized, however, that it is desirable not to stitch right in the crease but a little bit outside the crease distant from it by 1 mm. or so. This insures that in the subsequent turning the creased parts will hinge on the crease rather than on the stitch; furthermore, by keeping the stitch a little bit away from the crease the formation of good collar points is facilitated.

Figure 15:
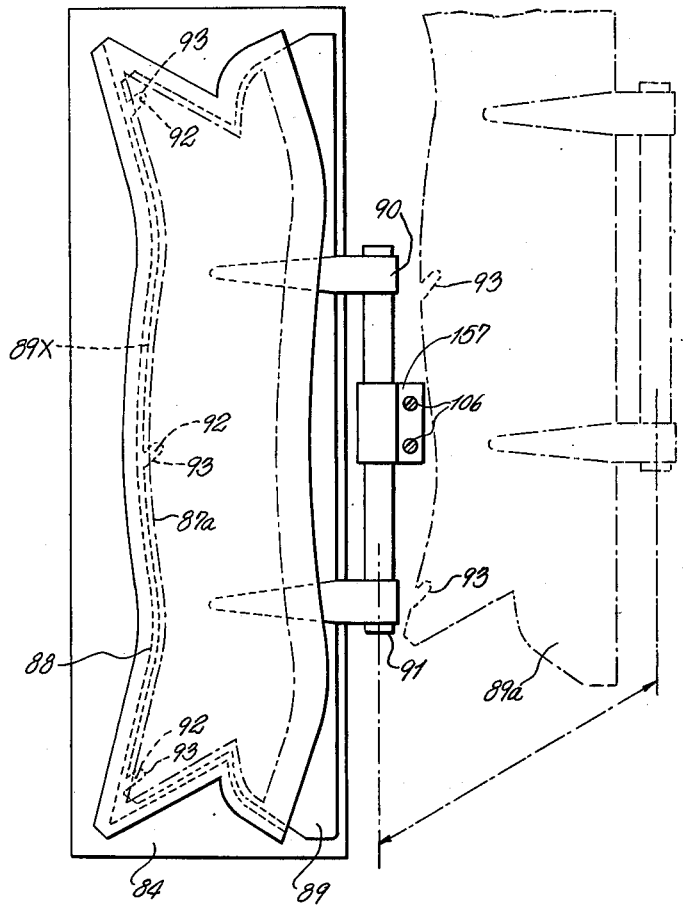
Fig. 15 is a schematic plan view of a modification wherein a partially run assembly is gauged by the running stitch with reference to the creasing die.
Figure 16:
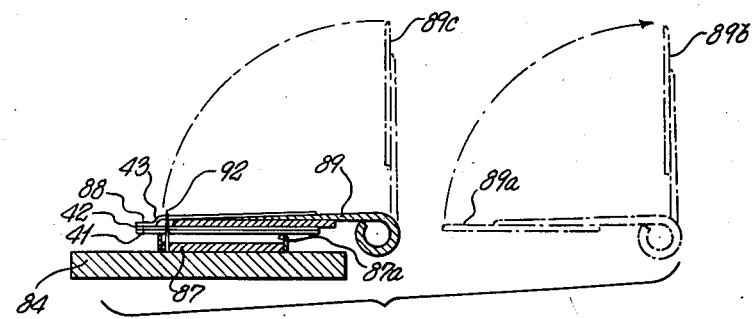
Fig. 16 is a schematic end view of the parts shown in Fig. 15.
Figure 27:
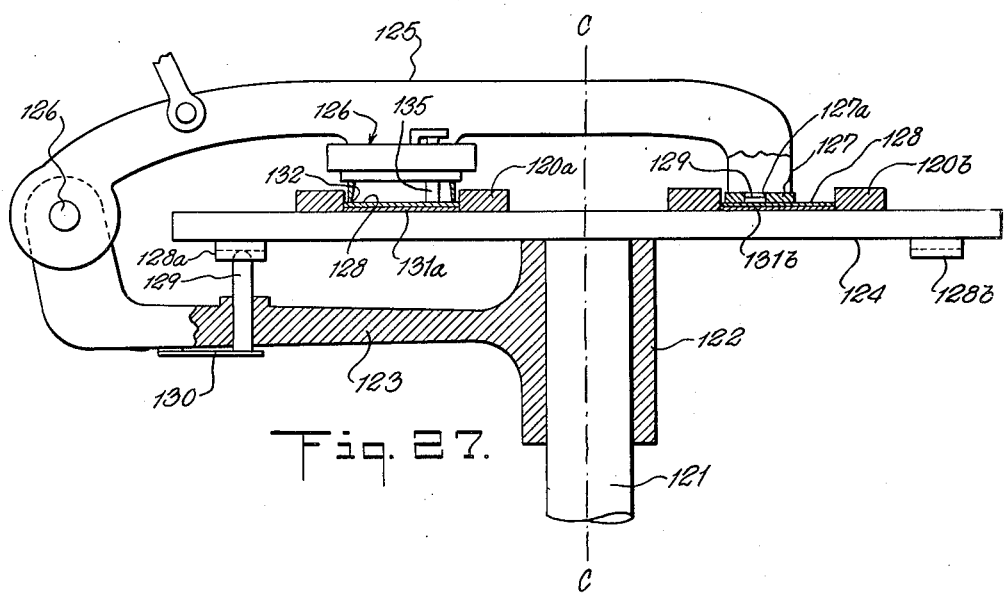
Fig. 27 is a side elevation partly in section of an alternative mechanism for making a marginal crease in a registered collar assembly and for determining the deposition of stiffening material along the band portion of the assembly for defining the foldline.
Figure 28:
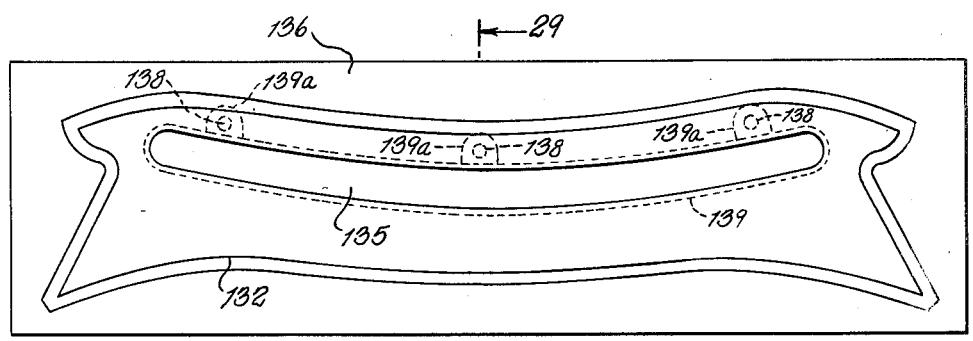
Fig. 28 is a detail view on an enlarged scale of the crease-forming die shown in Fig. 27 viewed from below.
Figure 32:
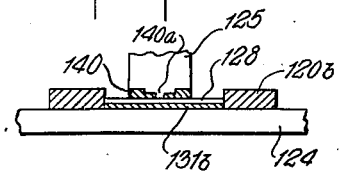
Fig. 32 is a side elevation detail view of a modified type of applicator adapted for use with a mechanism of the type shown in Fig. 27.
Figure 29:
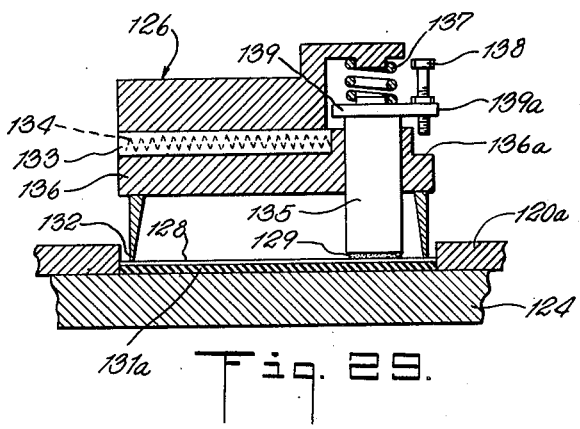
Fig. 29 is a side elevation on an enlarged scale of the crease-forming die taken on the line 29—29 of Fig. 28 when in position for forming a marginal crease in a registered collar assembly resting on the support and showing the pressing foot associated with the crease-forming die for subjecting the stiffening material applied to the registered collar assembly to heat and pressure.
Figure 30:
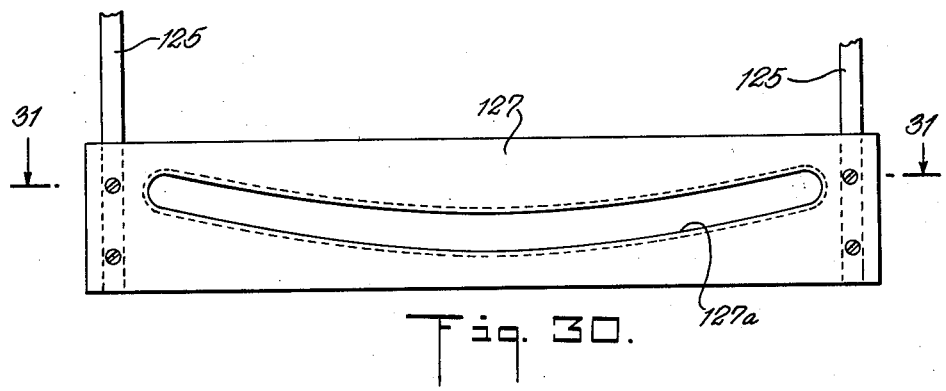
Fig. 30 is a detail view from below and on an enlarged scale of the applicator member of the apparatus shown in Fig. 27.
Figure 31:
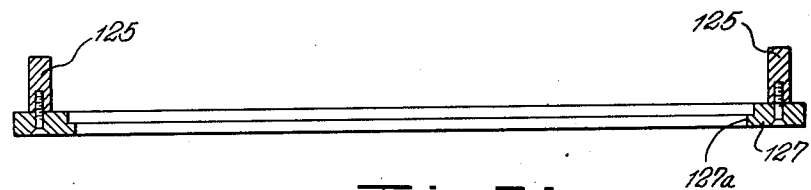
Fig. 31 is an end sectional elevation of the applicator member taken on the line 31—31 of Fig. 30.

In the methods described in connection with Figs. 2 to 14 inclusive the running is to be performed after the creasing operation. However, in most plants the operatives are accustomed to stitch according to a gauge and not according to a crease or mark; hence the methods hitherto described will often involve a substantial amount of retraining. To eliminate this retraining, or most of it, a modified method may be employed, which is illustrated schematically in Figs. 15 and 16. In this modification, the collar is run but preferably one end of the collar assembly is left unseamed. Referring to Figs. 15 and 16, the collar plies are shown at 41, 42 and 43 as heretofore, the collar plies resting on the creasing edge 87a of the creasing die 87. The running seam is shown at 88. It is to be noted that in this embodiment the seam 88 is not made along the right-hand edge of the collar assembly, as seen in Fig. 15. For clarity the separation of the running seam 88 from the creasing edges 87a is exaggerated in Figs. 15 and 16. In this embodiment a template 89 is employed which with minor modifications conforms to the shape of the finished collar and which is hinged at 90 with respect to the rod 91. The rod 91 is slidably mounted in any suitable way for horizontal movement in the direction indicated by the arrow relative to the lower pressure plate of a press which carries the creasing die 87, as, for example, the pressure plate 84 of the press shown in Fig. 14. Thus, the slide mechanism described below in connection with Figs. 17 and 18 may be employed as by supporting the rod 91 by a clamp 157 which is bolted to the slide plate 104 shown in Figs. 17 and 18 by the bolts 106.

In Figs. 15 and 16 the template 89 is shown in four different positions, viz., 89, 89a, 89b and 89c. In position 89b the template stands vertically; this is the "loading" position. In this position the seamed plies are slipped over the template, an operation which is readily performed since one end of the collar is left unseamed. The collar is pushed downward and to the right so that the template substantially fills the interior of the collar assembly. The template is then slidably moved to position 89c and is then rotated into position 89. In this position it conforms accurately to the creasing edge 87a of the creasing die 87 and is so arranged that the external contours of the template will lie slightly outside the contours of the creasing edge 87a. To insure positioning of the collar in the accurate location provided by the template as swung into position 89, pins 92 may be provided which are rigidly held by the creasing die 87 and on which the collar becomes impaled when the template is swung from position 89c into position 89. The template 89 has notches 93 therein to accommodate the pins 92. After this operation the template is withdrawn while still horizontal by sliding into position 89a. It may then be rotated back into the loading position 89b. The sequence of operations is as follows: Template in loading position 89b; collar slid over and pushed onto the template; template then slid into position 89c and then rotated into position 89 setting the collar assembly over the creasing die in accurate registration; template then withdrawn by sliding into position 89a and then rotating back into 89b.

After the collar assembly has thus been placed in accurate location with respect to the creasing die 87, with the stitched line just outside the creasing edge 87a, the collar assembly is pressed against the creasing edge 87a as above described, e. g., by bringing the pressure head 82 of Fig. 14 down into operational position. The crease thus formed is parallel to and slightly inside of the running stitches. The collar is then removed from the machine. The end which has been left open may then be seamed up with the crease as a guide. In view of the small amount of seaming required here this last step involves no substantial amount of retraining of operatives. Alternatively indeed both ends may be left unrun.

While for clarity in the showing in Figs. 15 and 16 the creasing die 87 has been shown without any applicator associated therewith, it is apparent that an applicator such as that shown in Figs. 10 to 14 or in Figs. 17 and 18 may be employed so that when the creasing operation is performed, stiffening material will be applied simultaneously to the underside of the collar assembly while the assembly is in the position on the creasing die that is determined, as aforesaid, by gauging with reference to the running stitch.

The extent to which the collar may be run before performing the creasing and foldline forming operation here described may be varied from complete running (which requires collapsible dies for withdrawal of the template) down. A priorari, the most desirable way from the standpoint of accuracy is to run only one end of the collar-top and the long edge of same, leaving unrun the other end of the collar-top and both band ends. In this way, all the previous errors in cutting, registering and stitching are, so to speak, "lumped" at the unrun end of the collar top and are there corrected by the crease. Experience has confirmed this; thus, it has been found that under good operating conditions variations greater than plus or minus $\frac{1}{16}''$ occur at the unrun end even at this early stage when the collar is placed over the template; these variations are eliminated practically completely by the crease formed at the unrun end. Similar remarks apply to the band ends, both of which are preferably left unrun before creasing and seamed afterward according to the crease.

Even when only one end and the long edge of the collar-top are run before creasing, there is an appreciable variation between the shape of the stitch-line and the shape of the crease. Unless this variation is excessive, it does no harm, because it is the crease and not the stitch (which should always lie outside the crease) that determines the final contours of the collar. Excessive difference between stitch-shape and crease-shape will cause objectionably deep "lips" to be formed along the finished edge of the collar after turning and completing the collar.

It will be noted in Fig. 15 that the edge 89x of the template 89 is shown separated from the running seam 88. This showing is purely for clarity. In practice, the edge 89x of the template 89 will, in general, be very close to the running stitch 88 when the collar is pulled over the template, except for accidental differences mentioned above between stitch-shape and crease-shape.

In Figs. 17 and 18 mechanisms are shown in greater detail which are of the same general type described above in connection with Figs. 15 and 16 except for various modifications. Operationally speaking, the principal change lies in the fact that in Figs. 17 and 18 the template always remains horizontal, i. e., is loaded in the horizontal position. The mechanisms shown in Figs. 17 and 18 are adapted for inclusion in any type of press comprising upper and lower pressing members, but will be described for purposes of illustration in relation to the press shown in Fig. 14.

In Figs. 17 and 18 the pressure plate 84 including the heating elements 85 and the insulation 86 are substantially the same as in Fig. 14. These parts are carried by the support plate 94 which in turn is secured to the frame members 72 as by the angle bars 95 and screws 96. The pressure plate 84 and the insulation 86 may be maintained in position relatively to the support plate 94 in any suitable way as by screws 97a, preferably with spacer bars 97 between the support plate 94 and the insulation 86. The creasing die consists of the plate 98 whose contours correspond to the desired peripheral contours of the finished collar and to which the upstanding metal strip is secured as by screws (not shown but which may be the same as screws 65 shown in Fig. 10), the metal strip presenting the crease-forming edge 98a. Fitting within corresponding opposed holes in the pressure plate 84 and in the creasing die plate 98 there are dowel pins 99 which permit ready removal of the creasing die from the pressure plate 84 but which fix the position of the creasing die when it is placed on the pressure plate 84.

In Figs. 17 and 18 a preferred type of applicator is shown adapted for the application of a strip of stiffening fabric to the underside of a collar assembly resting on the creasing edge 98a at the same time that the assembly is pressed against the creasing edge to form a crease therein. This applicator consists of the bar 100 secured to the creasing die 98 as by screws 101. The upper surface of the bar 100 presents a central land portion 100a which is bordered on each side by channels 100b, the channels 100b being recessed below the level of the land 100a but being brought up on the outer edges thereof to provide a certain amount of overhang as shown. In use a strip of fabric is slipped endwise underneath the overhang of the channels and is thereby held by the bar 100 in such a way as to prevent accidental displacement from its desired accurate location. When the collar assembly is subjected to pressure to form the crease, the assembly is pressed against the portion of the strip of fabric overlying the land 100a to effect the desired adhesion in the manner that has already been described herein and when the assembly is removed from the creasing die after the creasing operation the strip of stiffening fabric will be carried therewith. As before, the bar 100 is located so that one margin of the strip of stiffening material as applied to the collarband will be accurately positioned at or adjacent the foldline, for example, in the manner illustrated in Fig. 9.

Secured to the underside of the support plate 94 as by screws 101 there is a pair of spaced rails 102 presenting on the inner sides thereof opposed slide channels 103 in which the slide plate 104 is slidably mounted. The bar 105 is securely bolted to the end of slide bar 104 by the bolts 106, the spacer 107 being disposed therebetween to give the bar 105 the desired elevation. The rear edge of the template 108 has notches 109 therein which accommodate the screws 141 between the bars 142 and 143. The template is thus readily removable but is held firmly in place upon tightening the screws 141 to clamp the edge of the template between the bars 142 and 143.

The assembly of the template 108 and bars 142 and 143 is maintained in position by the guide rods 144 which are rigidly secured to the bar 143 and which slidably fit within holes 145 in the bar 105 and within guide bushings 146 secured to the underside of the bar 105. The template 108 and its associated parts are maintained in normal elevated position by the springs 147 and the upward movement of the rods 144 is limited by snap rings 148 secured to their lower ends.

It is seen from the foregoing that the template 108 is slidable between one position over the creasing die and another position clear of the creasing die and toward the operator. The movement of the template toward the operator can be limited in any suitable way as by providing a pin 149 which is adapted to strike against the cross tie 150 secured to the rails 102. The precise position where this movement is limited can be adjusted as by providing a plurality of holes 151 in the slide plate 104 in which the pin 150 can be selectively placed. When the template 108 is moved to position over the creasing die 98, its movement is limited by the pins 152 on the underside of the template 108 striking the stops 153 which are secured to the creasing die itself. In this way, accuracy of location of template 108 relative to creasing die is determined by the pin and stop arrangement 152—153 rather than by built-in accuracy of the machine.

The operations using the mechanisms shown in Figs. 18 and 19 will now be described. The template is first moved toward the operator, i. e., to the position shown in Figs. 17 and 18. A collar assembly which has been partly run as indicated above in connection with Figs. 15 and 16 is fitted over the template 108 with the template between the plies until the running stitch is snugly against the peripheral contours of the template. The template with the collar assembly fitted thereon is then moved over the creasing die until the pins 152 contact the stops 153. This movement is permitted because the template in its normally elevated position clears the creasing die. The operator then depresses the template with the collar assembly thereon against the action of the springs 147 to the level indicated by dotted lines in Fig. 18 whereupon the collar assembly becomes impaled on the upstanding pins 154 which are fixed to the creasing die in position corresponding to the notches 155 in the template. While the template is still depressed the template is again moved toward the operator so as to clear the creasing die whereupon it can be permitted to resume its normal elevated position as shown in Figs. 17 and 18. The collar assembly is thereby left deposited on the creasing die with the running stitch accurately gauged just outside the crease-forming edge 98a, i. e., as described above in connection with Figs. 15 and 16. Upon bringing the upper pressure plate of the press down, the collar assembly will have the crease formed therein and will have the stiffening material applied to the band portion thereof as above described.

An alternative means for carrying out the objective of this invention is described below in connection with Figs 19 to 22. This means has the advantage of requiring a minimum of special mechanism, namely, a template, which may be used in conjunction with an ordinary hot press. The crease is formed by the marginal contours of the template which has been cut to correspond with the desired finished contours of a given collar, and the material which determines the location of the foldline is deposited on the registered collar assembly through an appropriate aperture in the template. This alternative means will first be described as adapted for the application of resist material to the adhesive-carrying lining of a collar assembly adapted for making a one-piece collar of the fused type.

In Figs. 19 to 22, 110 is a registered collar assembly consisting of the lining ply 110a, the face ply 110b, and the back ply 110c. In this instance all of the plies are cut to substantially the same peripheral contours. 111 is a rubber padding on which the assembly rests. 112 is a template which is cut to the shape of the finished collar and which is superimposed on the assembly as shown. 112a is a slot or aperture in the template 112 whose shape and position determine the location of the foldline, and 112b is a groove surrounding the slot as indicated in order to reduce the thickness of the template in the region of the slot. After repeated use the template 112 will become heated and for convenience in handling the template may be provided with a handle shown in dotted lines at 116, but the handle is not necessary and may be omitted. In operation the operator can, of course, use a gloved hand if the template is too hot to be conveniently handled. Alternatively a magnet may be used to handle the template if the template is made of ordinary steel.

As aforesaid, the template may be used in conjunction with an ordinary hot press such as that shown in Fig. 21 wherein the rubber padding 111 lies on the lower buck 113. The upper buck 114 is pivoted at 115, and conventional means (not shown) may be used whereby the upper buck can be raised and lowered between the positions shown in solid and dotted lines in Fig. 21. The bucks can be heated in any convenient way as by admission of steam through the lines 113a and 114a.

When using the template 112, the template is first registered in desired location with the peripheral contours of a collar assembly resting on the rubber backing 111. The resist material can then be squeegeed through the slot 112a onto the lining which is the uppermost ply. The upper buck is then brought down so as to apply heat and pressure to the template and thereby force the template into the registered plies of the collar assembly which in turn are forced into the rubber backing to thereby create the desired crease along all edges of the template adjacent the margin of the assembly as shown in Fig. 22. This crease corresponds to the finished shape of the collar and after the foregoing operations have been completed the collar assembly is as hereinabove described in connection with Fig. 7.

In carrying out the operations above described in connection with Figs. 19 to 22 the heat of the press will accelerate the drying of the resist material so that no special drying operation is necessary. Because of the action of the heat in drying the resist material, the resist material normally is applied before the crease is formed but this sequence can, of course, be reversed. The same is true in connection with the use of apparatus of the types shown in Figs. 2, 3, 4, 5, 6 and 8 which have been described hereinabove whether resist or stiffening material is applied and is also true in connection with the use of the apparatus of Figs. 24 to 32 that are described below. The claims herein are to be interpreted in this light.

In Figs. 19 to 22, the marginal contours of the template, while plain, constitute the crease-forming edge thereof and the crease is formed thereby due to the sharp flexure of the collar assembly along the edges of the template when the template and the underlying collar plies are pressed into the padding 111, as shown in Fig. 22. The effectiveness of the edges of the template in forming a crease in the plies of the collar assembly may be increased by relieving the underside of the template to form a protruding crease-forming edge along the margin of the template as indicated at 112d in Fig. 23, so as to bite into the collar plies when the template and the underlying collar plies are pressed into the padding 111.

Mechanism of the type described above in connection with Figs. 19 to 23 is also well adapted for use in accordance with this invention when the material deposited on the registered collar assembly to determine the location of the foldline is stiffening material applied to the band portion with a margin thereof along and immediately adjacent the foldline; and such adaptation and use of the mechanism is described below in connection with Figs. 24, 25 and 26.

Fig. 24 is the same as Fig. 19 as to the corresponding elements which are indicated by like reference characters, but instead of providing the template 112 with a narrow slot 112a as shown in Fig. 19, a wider slot 117 within the groove 118 is provided. The margin or edge 117a of the slot 117 is located as before so as to be immediately adjacent the foldline of the collar so that after stiffening material is applied to the registered collar assembly on which the template is superimposed as shown in Fig. 24 and after the template has been pressed into the assembly to form a marginal crease thereon, the stiffening material which determines the foldline will be located with reference to the crease which determines the contours of the finished collar as described above in connection with Fig. 9. The operation of the mechanisms shown in Figs. 19 to 23 when using the template shown in Figs. 24 and 25 is essentially similar to that which already has been described in connection with Figs. 19 to 23.

The stiffening material that is applied to the collar assembly in using the template shown in Figs. 24 and 25 may be any of the kinds mentioned elsewhere herein, and it has been mentioned above that under certain circumstances when the stiffening material is in the form of an adhesive-bearing fabric it is desirable to subject the adhesive-bearing fabric to pressure and heat to cause it to adhere to the ply of the collar assembly to which it is applied. While this can be accomplished in any desired way, it can be conveniently accomplished during the crease-forming operation by using the closure 119 shown in Fig. 26 which has the portion 119a that fits within the groove 117. The closure is dimensioned so that when the underside of the flange 119b rests on the bottom of the groove 118, the upper face of the closure will be substantially flush with the upper surface of the template and the bottom face of the closure will be substantially flush with the bottom of the template. In such case after placing the band of adhesive-bearing stiffening fabric in the slot 117 of the template, the closure may be placed in the slot and when the press is closed the adhesive-bearing band of stiffening fabric will be subjected to heat and pressure. Such an operation may be especially desirable when the collar is of the soft type (except for the stiffening band), for a separate fusing step can thereby be avoided.

In employing the template modification according to this invention as described above in connection with Figs. 19 to 26, there are certain advantages in having the template entirely free both from the standpoint of the simplicity of the equipment required and because of the fact that no changes in mechanical registry are required when changing the template from one size or style of collar to another. However, instead of having the template entirely free, the template may be substituted for the type of creasing die and stencil applicator shown in Figs. 2 to 6 and 8, i. e., with the stencil carried by the arm 56 of the press shown in Figs. 3, 4 and 5 so as to register with a collar assembly resting on the rubber backing 44 in the location determined by the gauge plate 45. Except for the simpler type of creasing die and stencil aperture afforded by the template, the operation in producing the crease and in applying the resist or stiffening material is essentially the same as hereinabove described in connection with Figs. 2 to 6 and 8.

In the types of mechanism hereinabove described the creasing die and applicator arrangement is such that the applicator is presented within the crease-forming edge of the creasing die so that when the collar assembly is located for receiving the crease-forming edge in desired registration therewith, the assembly is also located in position for receiving the resist or stiffening material in the location determined by the applicator. In Figs. 27 to 31 an alternative mechanism is shown whereby the objectives of the invention may also be accomplished and wherein the creasing die and applicator are spaced from each other and the collar assembly is moved from one to the other by mechanical motions which are controlled by the design of the apparatus so that stiffening material applied to the collarband of the assembly or resist applied along the foldline is in accurately predetermined spaced relationship to the crease formed by the creasing die.

In Figs. 27 to 31 the mechanism shown is largely diagrammatic so as to show the primary operating principles involved. A generally similar mechanism is shown in greater detail in my aforesaid application Ser. No. 790,042 and for structural refinements reference is made to the disclosure in this application.

In the mechanism shown in Figs. 27 to 31 there are two gauges each of which may be identical with that shown in Fig. 6, these gauges being indicated at 120a and 120b. These gauges are spaced 180° with respect to the center line c—c of the vertical shaft 121 which rotates on a bearing 122 supported by the base 123. At its upper end the shaft 121 carries a table 124 on which the gauges 120a and 120b are placed and located by any suitable means (not shown), such as screws, pins, or the like. It will be understood that these gauges are accurately (within working tolerances) spaced symmetrically with respect to the center line c—c. An arm, or preferably a pair of parallel arms 125 (hereinafter referred to as the arm 125), is carried by the base 123 by means of a pivot shown at 126, so that the arm may move to and away from the table 124. The arm 125 carries the creasing die 126 which is accurately positioned with respect to the gauge 120a. The arm 125 also carries the template or stencil 127 which is accurately positioned (within reasonable tolerances) with respect to the creasing die 126. The arm 125 can be raised and lowered by any convenient means (not shown) and when in lowered position the lowering means is adapted to impose pressure directed toward the upper surface of the table 124. The table 124 can be swung by manual rotation thereof into two positions of registration determined by the elements 128a and 128b which coact with the pin 129 that is pushed upwardly by the spring 130, the combination of these mechanisms acting as a detent to hold the plate 124 in the registered position shown, or in a position 180° from the position shown, i. e., with the element 128b, in contact with the pin 129 instead of the element 128a.

A sheet of rubber or other yieldable resilient material shown at 131a and 131b is placed in or under the gauges 120a and 120b respectively so that when the registered collar assembly is placed in either gauge it will rest on the padding provided by the rubber sheet. In this embodiment it will be noticed that the applicator 127 is in the form of a simple stencil-like plate having the slot or aperture 127a therein which is shown in detail in Figs. 30 and 31 and which is adapted to apply stiffening material to the collarband.

When the arm 125 is in its upward or retracted position, a registered collar assembly 128 is placed in a gauge, say gauge 120b. In order to maintain the assembly in position relative to the gauge 120b, two or more pins (not shown) may be used, but in practical operation it has been found that the use of such pins is unnecessary. The arm 125 is then brought down so as to bring the template 127 into contact with the assembly. The stiffening material, which may be any of the kinds described above, is then deposited on the upper ply of the assembly through the slot 127a (the stiffening material being indicated at 129). After the stiffening material has been deposited in this way, the arm 125 is raised, the table 124 is rotated 180°, a fresh registered collar assembly is laid in the gauge which is brought before the operator by this rotation and then the arm 125 is brought down again. This causes the creasing die 126 to make a crease in the collar assembly along and adjacent the margin thereof, since the collar assembly is in register with the creasing die. After this same operation (lowering the arm 125), the operator can deposit stiffening material on the collar assembly under the template 127. After these operations have been performed, the arm 125 is again raised, the table is again rotated 180°, the collar assembly which has been creased and which carries the stiffening material is removed from the machine, a fresh collar assembly is put in the gauge in front of the operator, and the arm 125 brought down again, whereupon the operator can deposit stiffening material on the collar assembly in the gauge in front of him while the collar assembly in the other gauge is being creased by the pressure imposed by the arm 125 forcing the creasing edge 132 of the creasing die 126 against the collar assembly resting on the table 124. Ordinarily the stiffening is applied to the registered collar assembly before the creasing operation so as to take advantage of the heat of the creasing die in accelerating the drying of the stiffening material if the stiffening material is applied in liquid form or if it is applied in the form of a fabric carrying an adhesive activated by a solvent. However, the sequence described may be reversed.

As described hereinabove, the aperture 127a in the applicator 127 is of such shape that the stiffening material is applied to the band portion of the registered collar assembly with one margin thereof as determined by said aperture immediately adjacent the foldline of the collar and due to the mechanical action imposed by the machine the crease-forming edge of the creasing die 126 forms a marginal crease in the collar assembly in predetermined spaced relationship to the foldline of the collar as determined by the location of the stiffening material. To obtain a good permanent crease the creasing die 126 should be heated and for this purpose it may have associated therewith a heating plate 133 containing resistor wires 134 which may be connected to a source of electric current (not shown) for the purpose of supplying heat.

It has been mentioned hereinabove that if the stiffening material that is applied to the registered collar assembly is in the form of an adhesive-bearing fabric, it may be desirable to subject the adhesive-bearing fabric to pressure and heat as applied to the collar assembly to cause it to adhere to the collar assembly before the assembly is turned. This may be readily accomplished using the mechanism shown in Figs. 27 to 31 by means of the pressing foot 135. This pressing foot is in the form of a bar which moves vertically in a corresponding shaped slot in the plate 136 comprised in the creasing die 126. The shape of this bar, or at least the shape of its lower end, is substantially the same as the shape of the band of adhesive-bearing fabric that is deposited on the registered collar assembly and registers therewith in the position determined by the slot 127a in the template 127. In other words, the shape of the lower end of the presser foot 135 is substantially the same as the shape of the slot 127a. A spring or series of springs 137 presses downward on the bar 135, and downward movement of the bar 135 is limited by the set screws 138 carried by the ears 139a of the flange 139, which is integral or fastened to the bar 135, striking against the abutment 136a of the plate 136. The heating plate 133 will heat the bar 135 as well as the creasing die 126. When the arm 125 is brought down so as to bring the crease-forming edge 132 of the creasing die 126 against the registered collar assembly 128, contact will first be made between the bar 135 and the stiffening band 129 resting on the collar assembly. The adhesive-bearing fabric is thereby pressed against the collar assembly 128 and by means of this pressure and heat the band of adhesive-bearing fabric is fused to the uppermost ply of the collar assembly.

When the stiffening material that is employed utilizing the mechanism shown in Figs. 27 to 31 is in liquid or semi-liquid form, the pressing foot 135 may be omitted, or, alternatively, the ultimate lowered position of the bar 135 relative to the crease-forming edge of the creasing die may be adjusted by resetting the set screws 138 so that when the arm 125 is lowered the lower end of the bar 135 will remain out-of-contact with the collar assembly resting on the table, and in such case the proximity of the heated lower end of the bar 135 to the stiffening material deposited on the collar assembly is advantageous since the heat accelerates the drying of the applied stiffening material.

While the mechanism shown in Figs. 27 to 31 has been described in connection with the application of stiffening material to the collarband for the purpose of defining the location of the foldline between the foldover and band portions of the collar, it is also applicable to the location of the foldline by the application of resist material to the registered collar assembly. For this purpose the stencil 127 with the slot 127a appropriate for the application of stiffening material may be replaced by the stencil 140 shown in Fig. 32 which has the narrow slot 140a therein. The slot 140a, as before, is narrow and is adapted for the application of resist material therethrough. Thus, the shape of the slot 140 may be the same as the shape of the slot 49a shown in Fig. 6. When the mechanism shown in Figs. 27 to 32 is used for application of resist material to the registered collar assembly the presser foot 135 can be omitted from the creasing die or can have its position adjusted by the set screws 133 so as to remain out-of-contact with the applied resist, the proximity of the heated presser foot serving to accelerate the drying of the resist. When using the mechanism in the application of the resist in predetermined spaced relationship to the crease produced by the creasing die the operations involved are essentially the same as those hereinabove described except that instead of applying stiffening material, resist is squeegeed through the slot 140a onto the underlying registered collar assembly, along the foldline.

In the foregoing description of this invention with particular reference to Figs. 2 to 6, 19 to 23 and 32 it has been indicated that resist material may be employed in liquid or semi-liquid form which can be applied as by squeegeeing it through a stencil aperture and which after application and drying affords a covering which prevents the adhesive-carrying lining ply of a fused collar from fusing with a collar ply in contact therewith along the foldline where the resist material is applied when the collar assembly after turning is subjected to the usual fusing step. A solution or emulsion of some suitable material such as modified starch, cellulose ether or the like is suitable for the purpose. Alternatively the resist material used may be preformed. Thus, a cord, or a narrow band of tissue paper, or a strip of cellophane may be used for the purpose. In such case the preformed resist material may be applied through the stencil aperture of any of the mechanisms shown in Figs. 2 to 6, 19 to 23 and 32 for accurately locating it with reference to the crease formed by the creasing die. Alternatively, applicator means such as that shown in Figs. 10 to 14 may be employed as by placing the rubber strips 68 closer together with the space between them immediately underlying the desired predetermined location of the foldline. The mechanism shown in Figs. 17 and 18 may be similarly modified. When a preformed resist material is employed, a small amount of solvent applied either to the preformed resist material or to the adhesive-carrying lining ply of the collar assembly or to both, will afford sufficiently firm adhesion of the preformed resist material to the lining ply by peptizing the adhesive carried by the lining ply so that the so-applied preformed resist material will remain in the desired location during the subsequent collar-making operations prior to the fusing step. During the fusing step the preformed resist material will become solidly fused to the lining but will prevent the lining ply from adhering to the collar ply in contact therewith where the resist material is between them along the narrow zone defining the foldline.

Figure 33:
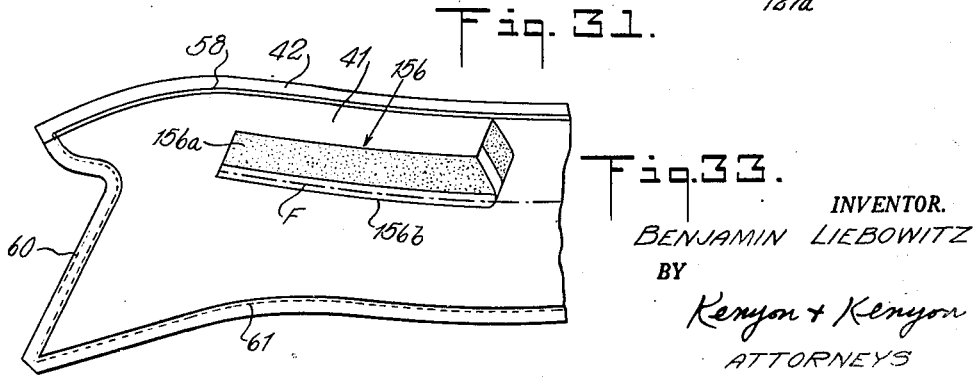
Fig. 33 is similar to Fig. 9 showing modified foldline-forming means.

With further reference to the use of resist material in the practice of this invention, the method and apparatus of this invention is well adapted for the manufacture of collars as disclosed in my application executed on even date for Collars and the Manufacture thereof, Serial No. 79,757, filed March 5, 1949, now abandoned, which is characterized by a strip of stiffening material located in the band portion of the collar which strip is fused to one or both of the collar plies in contact therewith except along an edge thereof where resist applied to the strip prevents such fusion. In such case the mechanisms shown in Figs. 8, 10 to 14, 17, 18 and 24 to 31. i. e., the respective stencil apertures or other locating members, can be adjusted or dimensioned so that the resist-treated part of the material applied to the collarband will come at the foldline itself, as illustrated in Fig. 33. Thus, instead of applying stiffening material so as to fall entirely within the band portion of the collar assembly as shown in Fig. 9 at 62, the apparatus parts hereinabove described can be proportioned so that a strip of fabric, tape or the like is applied to the collar assembly in the position shown in Fig. 33, which is identical with Fig. 9 as to all parts indicated by like reference characters but which shows the strip indicated generally by the reference character 156 as having the body portion 156a adapted for fusing to the lining ply and an edge portion 156b which carries resist applied thereto and which overlies the foldline indicated at F. In this instance the foldline forming means includes both stiffening material applied to the collarband and resist material applied to the assembly in adherent relation thereto at a narrow zone along the foldline; and the application of both is controlled as to location according to the method and apparatus of this invention.

With regard to the stiffening material that is used as foldline forming means, it may be applied either in preformed condition or in the form of a liquid or semi-liquid. Any liquid or semi-liquid solution of a suitable water-insoluble resinous or similar material which hardens upon drying to afford the desired stiffness may be used for the purpose. However, stiffening material in the form of a strip or tape carrying an adhesive either in the form of interwoven adhesive yarns or as a coating or "dope" applied to one or both surfaces thereof is preferred. In the case of soft collars the application of the stiffening material in liquid or semi-liquid for or in the form of a permanently attached preformed strip is sufficient, but if the stiffening material is reactivated after the assembly is turned to fuse the applied stiffening material to an adjoining ply (ordinarily the back ply) the stiffening effect is enhanced. Where such subsequent fusing takes place the stiffening material, if in the form of a preformed strip, need only be temporarily adhered upon initial application. This is also true, as indicated hereinabove, when the collar is of the fused type and is subjected to the usual fusing operation after turning. When the stiffening material is employed either in liquid form or in the form of a preformed strip in the manufacture of fused collars, the increased stiffness in the region of the collarband affords the desired discontinuity of stiffness along the foldline. As aforesaid this discontinuity of stiffness along the foldline can be enhanced by locating resist material along the foldline in conjunction with stiffening material in the collarband.

With regard to the applicator means for applying the foldline-forming material (such as resist material applied along the foldline or stiffening material applied to the collarband) other applicator means than those illustrated may be employed whereby the foldline-forming material is transferred from the applicator means to the collarband, either with or without pressure contact between the applicator and the collar blank, so as to be accurately located with reference to the predetermined outline or contours of the finished collar; the type of applicator means used being largely governed by the type of foldline-forming material that is used although the particular means employed for predetermining the contours of the finished collar is also a significant factor.

After the running and turning, the parts may have the usual top stitching applied or may not, as desired. The bottom edge of the collar may be finished off in this operation in any desired manner, with the bottom edge turned on the crease, regardless of whether the collar is to be attached to a shirt, or is to be a separate collar. If the collar is to be attached to a shirt, then the stitching along the bottom edge should be some 8 or 10 mm. from said edge so as to permit insertion of the shirt in the lips thereby formed. If the collar is to be a separate collar then the stitching along the bottom edge should be close to the edge. In the case of the attached collar the bottom stitching need not be performed or may be partly performed so that the collar is left open and attached in the usual way in two operations. However, by finishing the stitching as above described (i. e., 8 or 10 mm. from the edge), the collar may be attached to the shirt in a single operation, thereby effecting an economy. In the case of a fused collar, the fusing operation may be performed after completion of all operations, either before or after attaching to the shirt (in the case of an attached collar).

In the manufacture of fused collars of the attached type the cutting of the lining ply somewhat narrower so as to fall short of the collar-setting region as shown in Fig. 1 is desirable inasmuch as the collar plies are ordinarily subjected to fusing before attachment to the shirt and inasmuch as such fusing would unite the collar plies right down to the bottom of the collar, unless other precautions were taken, if the adhesive-carrying lining ply were to be of the same width as the other plies. However, in the case of fused collars of the detached type the lining ply is ordinarily of the same width as the other plies as shown in Figs. 19 and 20, for in the case of collars of the detached type all edges are turned under before the fusing operation.

In the foregoing description the emphasis has been placed on the manufacture of one-piece collars, and the creasing step has been illustrated as being carried out in the preferred way, namely, with the formation of the crease so as to extend completely or substantially completely about the contours of the collar. However, the crease need not necessarily be carried completely about the collar contours. Thus it is not as important to crease the band portion as it is to crease the foldover or cap portion, for it is the foldover or cape portion of the collar that has occasioned the principal difficulties both with regard to the production of accurate contours and with regard to locating the foldline with reference to the collar contours. When the plies are appropriate for a two-piece collar, only those plies going into the foldover or cape portion need be creased.

It has been indicated hereinabove that the formation of a well defined crease is promoted by the heat to which the collar assembly is subjected during the creasing operation either as the result of heating the creasing die or as the result of heating the pressure plates used. If desired the formation of a firm crease may be assisted by moisture, as by moistening the margins of the collar assembly to be creased. Ordinarily, however, use of moisture is not necessary.

Usually, the registered collar assembly includes all of the plies contemplated in the finished collar. However, this is not necessarily the case. Thus, it has been pointed out above that when there are three plies, the crease that is formed in the collar assembly prior to turning is in the "right" direction as to two of the plies and is in the "wrong" direction as to the third ply for producing flexure along the line produced by the creasing upon subsequently turning the assembled plies. If desired, according to this invention, only those plies wherein the crease will occur in the "right" direction may be subjected to the creasing operation, e. g., two of the plies when the collar is a three-ply collar. This procedure has been described in connection with Figs. 10 to 14. In such case, the third ply either may not be creased at all or can be creased by a separate operation of the kind herein described so that the crease will occur in the "right" direction when the collar is assembled and subsequently is turned. Moreover, it is not outside the scope of the invention to produce the marginal crease in a single ply, e. g., the lining ply. Moreover, the foldline-forming material that is applied may be applied prior to the complete assembly of all of the collar plies, although it is preferably applied to the ply that is creased, ordinarily the lining ply, so as to better assure the accurate positioning of the collar foldline as determined by the location of the foldline forming means in relation to the contours of the finished collar as determined by the location of the crease. For these reasons, the term "collar blank" is used herein and in several of the claims in reference to any one or more of the preliminarily cut plies that go to make up the finished collar.

In connection with the foregoing it is to be understood that the mechanisms and procedures which have been specifically described hereinabove are merely by way of illustrating the practice of this invention in connection with typical examples thereof so that the nature and scope of this invention may be better understood. While it is preferable to employ the various features of this invention in combination, the practice of said features separately likewise is in accordance with this invention. Thus, the production of the marginal crease by itself as hereinabove described and illustrated is of great advantage in the manufacture of collars to accurate finished contours, whether the collars are of the attached, detached, one-piece, two-piece, fused or soft types. Moreover, the application to a collar blank of foldline-forming material so as to be accurately positioned with reference to the predetermined outlines or contours of the finished collar is an important feature of this invention in the manufacture of collars whether of the fused or soft type. While it is highly desirable, as emphasized herein, to crease the entire collar-top portion and also at least the band ends, even when the collar is partly run before the creasing operation, nevertheless, it is sufficient for some purposes merely to crease the unrun part of the collar assembly when the assembly is partly run before creasing.

I claim:

1. In a method of making a collar or the like having a fold-over portion and a band portion and comprising a plurality of cut fabric plies providing at least the fold-over portion of the collar wherein said fabric plies are assembled, stitched along and adjacent the margin thereof that occurs along the marginal portion of said fold-over portion of the finished collar and the plies of the assembly are thereafter turned to bring to the exterior of the assembly surfaces of said plies presented at an interior interface of the assembly prior to turning, the steps comprising pressing at least one of said plies prior to turning between a crease-forming edge and a backing of yieldable resilient material along a line adjacent the margin thereof to form a crease in said ply following the contour of said line and disposed according to the predetermined outline of said fold-over portion of the finished collar, and subsequently turning the assembly with flexure of said ply substantially along said crease.

2. A method of making a collar or the like according to the steps of claim 1 wherein said crease is formed as recited in claim 1 so as to extend substantially completely about said collar ply.

3. A method of making a collar or the like according to the steps of claim 1 wherein said fabric plies are cut prior to assembly so as to provide the band and fold-over portions of a one-piece collar.

4. A method of making a collar or the like according to the steps of claim 1 wherein all of the collar plies are assembled and are simultaneously pressed to form said crease in each of said plies.

5. A method of making a collar or the like according to the steps of claim 1 wherein heat is applied to said ply while said ply is under pressure between said crease-forming edge and said backing of yieldable resilient material to promote the formation of said crease.

6. A method of making a collar or the like according to the steps of claim 1 wherein assembled collar plies prior to turning are placed on a support presenting a surface composed of said yieldable resilient material, and wherein a creasing die presenting said crease-forming edge conforming to a line within and adjacent the margin of the fold-over portion of the assembly is pressed thereagainst with depression of said collar plies into said yieldable resilient material to form a crease in said plies corresponding in contour with said crease-forming edge.

7. A method of making a collar or the like according to the steps of claim 1 wherein assembled collar plies prior to turning are placed on a creasing edge disposed along and adjacent the margin of the fold-over portion of the assembly and wherein said collar plies are pressed against said creasing edge by a member presenting a surface composed of said yieldable resilient material.

8. A method of making a collar or the like having a fold-over portion and a band portion and comprising a plurality of plies which comprises assembling the collar plies, stitching the collar plies along and adjacent the margin of the fold-over portion of the resulting assembly, then pressing the assembly between a crease-forming edge and a backing of yieldable resilient material along a predetermined line within and closely adjacent said stitching to form a crease in the plies of said assembly following the contour of said line and disposed according to the predetermined outline of the fold-over portion of the finished collar, and thereafter turning the assembly with flexure of said plies substantially along said crease.

9. A method of making a collar or the like according to claim 8 wherein said assembly after said stitching and prior to said pressing is fitted over a positioning template inserted between plies of the assembly to position said assembly for the pressing step.

10. A method of making a collar or the like according to claim 8 wherein said assembly is initially stitched only partly along the margin of the fold-over portion thereof and after said initial stitching and prior to said pressing is fitted over a positioning template inserted between plies of the assembly to position said assembly for the pressing step, and wherein said stitching is completed along the margin of the fold-over portion of the assembly after the pressing step and prior to turning.

11. In a method for the manufacture of a collar or the like from an assembly of cut fabric plies, the steps of partly running the assembly, gauging the assembly according to the running stitch, creasing an un-run part of the assembly with respect to the gauging, and completing the running substantially along said crease.

12. In a method of making a collar or the like having a fold-over portion and a band portion and comprising a plurality of plies wherein the collar plies are assembled, stitched along and adjacent the margin of the fold-over portion thereof and the plies of the assembly are thereafter turned to bring to the exterior of the assembly surfaces of said assembly presented at an interior interface of the assembly prior to turning, the steps comprising pressing between a crease-forming edge and a backing of yieldable resilient material at least one of said plies which is on the exterior of the assembly prior to turning along a predetermined line adjacent the margin thereof to form a crease in said ply following the contour of said line and disposed according to the predetermined outline of the fold-over portion of the finished collar, then stitching the assembly prior to turning substantially along said crease, and subsequently turning the assembly with flexure of said ply substantially along said crease.

13. In a method of making a collar or the like having a fold-over portion and a band portion and comprising a plurality of plies wherein the collar plies are assembled, the plies of the assembly are stitched along and adjacent the margin of the fold-over portion thereof and the plies of the assembly are thereafter turned to bring to the exterior of the assembly surfaces of said plies presented at an interior interface of the assembly prior to turning, the steps comprising pressing at least one of said plies prior to turning between a crease-forming edge and a backing of yieldable resilient material to form a crease therein adjacent the margin thereof along a line disposed according to the predetermined outline of the fold-over portion of the finished collar, adherently applying to said ply in accurately controlled location relative to said crease a material which affects the stiffness of the finished collar so as to provide discontinuity of stiffness of the finished collar along the fold line between said fold-over and band portions thereof in predetermined spaced relationship to said crease, and subsequently turning the assembly with flexure of said ply along said crease, the outline of the fold-over portion of the turned collar as determined by said crease being in predetermined spaced relationship to said fold line as determined by the location of said material.

14. In a method of making a collar or the like having a fold-over portion and a band portion wherein a plurality of cut collar plies are assembled and thereafter turned, the steps comprising pressing at least one of said plies prior to turning between a crease-forming edge and a backing of yieldable resilient material to form a crease in said ply adjacent the margin thereof along a line disposed according to the predetermined outline of the fold-over portion of the finished collar, adherently applying to one of the plies of the assembly in accurately controlled location relative to said crease a material which affects the stiffness of the finished collar so as to provide discontinuity of stiffness of the finished collar along the fold line between the fold-over and band portions thereof in predetermined spaced relationship to said crease, and subsequently turning the assembly with flexure of said ply substantially along said crease, the outline of the fold-over portion of the turned collar as determined by said crease being in predetermined spaced relationship to said fold line as determined by the location of said material.

15. In a method of making a collar or the like having a fold-over portion and a band portion from a blank comprising a plurality of plies, the steps comprising running said blank along the margin thereof, gauging said blank by means of the running stitch, and applying to one of said plies in predetermined location with respect to the same gauging fold line-forming means for determining the location of the fold line between the fold-over and band portions of the collar.

16. In a method for the manufacture of a collar or the like having a fold-over portion and a band portion from an assembly of cut fabric plies, the steps of partly running the assembly, gauging the assembly with respect to the running stitch, creasing an un-run part of the assembly with respect to the gauging, and applying to the assembly in predetermined location with respect to the same gauging means for determining the location of the fold line between the fold-over and band portions of the collar.

17. In a method of making a collar or the like having a fold-over portion and a band portion and comprising an outer ply, an inner ply and a lining ply, the steps comprising forming a crease in at least one of said plies predetermining the final marginal contours of the fold-over portion of the finished collar, applying to said ply on an ultimately interior surface thereof in the finished collar a material which affects the stiffness of the finished collar with at least one margin of said material disposed along the fold line between the fold-over and band portions of the collar in predetermined spaced relationship accurately gauged relative to said marginal contours as determined by said crease, and thereafter disposing said plies in the finished collar with said lining ply between said outer ply and said inner ply, thereby producing in the finished collar a fold line which is determined by the location of said material in accurately spaced relationship to the final contours of the fold-over portion of the collar as determined by said crease.

18. In a method of making a collar or the like having a fold-over portion and a band portion and comprising an inner ply, an outer ply and a lining ply carrying a substance activatable to effect adhesion of said lining ply with a ply in contact therewith wherein the plies are assembled with the lining ply on the exterior of the assembly, the assembly is turned to bring said lining ply between said inner and outer plies and said substance thereafter is activated to effect adhesion of said lining ply with a ply in contact therewith, the steps comprising forming prior to turning a crease in at least one of the collar plies adjacent the margin thereof along a line disposed according to the predetermined outline of the fold-over portion of the finished collar and also prior to turning applying resist material in adherent relation to said lining ply at a narrow zone along the fold line between the fold-over and band portions of the collar in predetermined spaced relationship to said crease, thereafter turning said collar with flexure of said creased ply along said crease while maintaining said predetermined spaced relationship between said crease and said resist material, and after turning activating said substance carried by said lining ply to cause said lining ply to adhere to a ply in contact therewith except at said narrow zone along the fold line where said resist material occurs, said creasing defining the outline of the fold-over portion of the turned collar in predetermined spaced relationship to the collar fold line as determined by said resist material.

19. A method of making a collar or the like according to the method of claim 18 wherein said resist material is applied through an aperture in a stencil and wherein said crease is formed in said lining ply by pressure contact with a creasing edge in predetermined spaced relationship to said aperture.

20. In a method of making a collar or the like having a fold-over portion and a band portion wherein the collar plies are assembled and the plies of the assembly are thereafter turned to bring to the exterior of the assembly surfaces of said collar plies that prior to turning are presented to an interior interface of the assembly, the steps comprising forming prior to turning a crease in at least one of the collar plies adjacent the margin thereof along a line disposed according to the predetermined outline of the fold-over portion of the finished collar and also prior to turning applying a stiffening material to the collar band portion of one of said plies with one margin thereof immediately adjacent the fold line between the fold-over and band portions of the collar in predetermined spaced relationship to said crease, thereafter turning the assembly with flexure of said creased ply substantially along said crease while maintaining said predetermined spaced relationship between said crease and said margin of said stiffening material, said crease defining the outline of the fold-over portion of the turned collar in predetermined spaced relationship to said fold line as determined by said margin of said stiffening material.

21. A method of making a collar or the like according to the steps of claim 20 wherein said collar comprises an inner ply, an outer ply and a lining ply and wherein said crease is formed in said lining ply.

22. A method of making a collar or the like according to the steps of claim 20 wherein said collar comprises an inner ply, an outer ply and a lining ply which are assembled prior to turning with the lining ply on the exterior, wherein said lining ply carries a substance activatable to effect adhesion of said lining ply with a ply in contact therewith, and wherein after turning said substance is activated to cause said lining ply to adhere to a ply of the turned collar in contact therewith.

23. A method of making a collar or the like according to the steps of claim 20 wherein said collar comprises an inner ply, an outer ply and a lining ply and wherein said crease is formed in the lining ply by pressure contact with a crease-forming edge and wherein said stiffening material is applied to said lining ply in position determined by contacting said lining ply with a locating member in predetermined spaced relationship to said crease-forming edge.

24. Apparatus for use in the manufacture of a collar or the like from a collar blank comprising a fold-over portion and a band portion, said apparatus comprising creasing means adapted to form a marginal crease in the collar blank, applicator means adapted for the application of material to the collar blank which determines the location of the fold line between the fold-over and band portions thereof, and means for actuating said creasing means in relation to said applicator means to produce a marginal crease in the collar blank in predetermined relative registration with material applied to said collar blank in the position determined by said applicator means.

25. Apparatus for use in the manufacture of a collar or the like from a collar blank comprising a fold-over portion and a band portion, said apparatus comprising a member presenting a surface composed of yieldable resilient material adapted for the pressing of a collar blank thereagainst, a creasing die presenting a crease-forming edge corresponding in contour with a line within and adjacent the margin of a collar blank, means for pressing a collar blank between the crease-forming edge of said creasing die and said surface of said member to produce a crease therein corresponding in contour to said crease-forming edge, and applicator means for effecting the deposition in predetermined location on said collar blank relative to said crease of a material which determines the location of the fold line between the fold-over and band portions of the collar.

26. Apparatus according to claim 25 which comprises means for subjecting said material as applied to said collar blank to heat.

27. Apparatus according to claim 25 which comprises means for subjecting said material as applied to the collar blank to pressure.

28. Apparatus for use in the manufacture of a collar or the like from a collar blank having a fold-over portion and a band portion, said apparatus comprising a member presenting a surface adapted for the pressing of a collar blank thereagainst, a creasing die mounted for relative movement with respect to said member into and away from position for pressing a collar blank between said creasing die and said surface of said member, said creasing die presenting a crease-forming edge that is opposed to said surface of said member and that corresponds in contour with a line within and adjacent the margin of the collar blank, gauge means arranged to maintain the collar blank during relative movement of said creasing die and said member in position for effecting the registration thereof with said crease-forming edge of said creasing die, means for pressing said creasing die and said member together to press said crease-forming edge against said surface to form a crease in said collar blank, and means for depositing on the collar blank in predetermined location relative to said crease a material which determines the location of the fold line between the fold-over and band portions of the collar.

29. Apparatus for use in the manufacture of a collar or the like which comprises a member presenting a surface adapted for the pressing of a collar blank thereagainst, a creasing die mounted for relative movement with respect to said member into and away from position for pressing a collar blank between said creasing die and said surface of said member, said creasing die presenting a crease-forming edge that is opposed to said surface of said member and that corresponds in contour with a line within and adjacent the margin of the collar blank, means for pressing said creasing die and said member together to press a collar blank between said crease-forming edge and said surface of said member to form a crease in the collar blank corresponding to said crease-forming edge, and an applicator adapted for the application of material to the collar blank which determines the location of the fold line thereof, said applicator presenting locating means adapted when in contact with said collar blank to determine the location of said material applied to the collar blank, and said applicator being mounted for relative movement with respect to said member into and away from position for pressing a collar blank between said locating means and said surface of said member for application of said material to the collar blank in predetermined spaced relationship determined by said locating means with respect to the crease produced by said crease-forming edge.

30. Apparatus according to claim 29 wherein said applicator is carried by a presser member so as to be yieldable relative thereto when said presser member is moved to establish pressure contact of said locating means with said surface of said member.

31. Apparatus for use in the manufacture of a collar or the like which comprises in combination, a creasing die adapted to form a marginal crease in the collar blank, an applicator adapted for the application of material to the collar blank to determine the location of the fold line thereof, a member presenting a surface composed of yieldable resilient material adapted for the pressing of a collar blank thereagainst, and motion imparting means constructed and arranged to effect relative motion between said creasing die, said applicator and said member to bring said creasing die and said applicator into operative position relative to said member to press a collar blank against said surface of said member for forming a marginal crease therein, and to apply said material to said collar blank to determine the location of the fold line thereof in predetermined spaced relation to said crease.

32. Apparatus for forming a marginal crease in a collar blank and for applying material to the collar blank to determine the fold line thereof which comprises a support, a creasing die presenting a crease-forming edge corresponding in contour with a line within and adjacent the margin of a collar blank, means for effecting relative movement between said creasing die and said support to bring said creasing die into and away from position for establishing pressure contact of said crease-forming edge with a collar blank resting on said support, and means for applying said material to the collar blank while resting on said support with at least one margin thereof substantially along the fold line of the collar blank and in predetermined spaced relationship to the crease formed in said collar blank by said crease-forming edge.

33. Apparatus for forming a marginal crease in a collar blank and for applying material to the collar blank to determine the fold line thereof which comprises in combination a crease-forming die adapted to form a marginal crease in a collar blank, a stencil having an aperture therein for application of said material therethrough to said collar blank, a support for said collar blank, and motion imparting means for effecting relative movement between said crease-forming die, said stencil and said support to bring said crease-forming die and said stencil into and away from position for forming a marginal crease in a collar blank by pressure contact with a collar blank resting on said support and for applying said material through said aperture to the collar blank resting on said support, said motion imparting means being arranged to produce said marginal crease in and for application of said material to the collar blank through said aperture in said stencil in predetermined positions of relative registration with at least one margin of said material as determined by said stencil substantially along the fold line of the collar blank in accurately spaced relationship to the crease formed in the collar blank by the crease-forming die.

34. Apparatus for forming a marginal crease in a collar blank and for applying material to the collar blank to determine the fold line thereof which comprises a support presenting a surface composed of yieldable resilient material, a template movable into and away from position overlying a collar blank resting on said support and means for pressing said template against a collar blank resting on said support, said template presenting a crease-forming edge corresponding in contour with a line within and adjacent the margin of the collar blank and adapted to form a marginal crease in the collar blank when pressed thereagainst and said template having an aperture therein which is adapted for application of said material therethrough to said collar blank and which has at least one margin thereof disposed substantialy along the fold line of the collar blank in predetermined spaced relation to said crease-forming edge.

35. Apparatus according to claim 34 wherein said template is mounted for movement into and away from a given position overlying said support and which comprises gauge means which is secured to said support and which is adapted and arranged to determine the location of a collar blank resting on said support for predetermined relative registration with said template when said template is moved into position overlying said support.

36. Apparatus for producing a marginal crease in a collar blank comprising a plurality of plies maintained in registration along a margin of the collar blank, said apparatus comprising a member presenting a surface adapted for pressing a collar blank thereagainst, a creasing die relatively movable with respect to said member for pressing a collar blank between said creasing die and the surface of said member to produce a marginal crease therein, and a template which is adapted for internally gauging the assembly and which is arranged in relation to said creasing die to accurately position the assembly with respect thereto.

37. In an apparatus for the manufacture of a collar or the like, a template adapted for internally gauging an assembly of collar plies that has been at least partly run, creasing means located and arranged with respect to said template to crease said assembly in the position determined by said gauging along and adjacent the margin thereof, and applicator means constructed and arranged for applying to the assembly in the position determined by said gauging a material which determines the location of the fold line of the collar.

38. Apparatus for use in the manufacture of a collar or the like which comprises an upwardly directed crease-forming die presenting a crease-forming edge which corresponds in contour with a line within and adjacent the margin of a collar blank, means for pressing a collar blank deposited on said upwardly directed crease-forming die against said crease-forming edge to form a marginal crease in said collar blank and gauge means disposed about the periphery of said upwardly directed crease-forming edge and adapted and arranged to position a collar blank deposited on said crease-forming die in registration with said crease-forming edge, the inner margin of said gauge means being normally disposed above the level of said crease-forming edge and being carried by means permitting depression of said gauge means to at least the level of said crease-forming die.

39. Apparatus for use in the manufacture of a collar or the like which comprises an upwardly directed crease-forming die presenting a crease-forming edge corresponding in contour with a a line within and adjacent the margin of a collar blank, means for pressing a collar blank placed on said upwardly directed crease-forming die against said crease-forming edge to form a marginal crease in said collar blank, and applicator means which is disposed to underlie a collar blank placed on said crease-forming die and which is adapted to apply to the underside of the so placed collar blank a material which determines the location of the fold line of the collar blank.

40. Apparatus according to claim 39 wherein said applicator means comprises spaced depressible locating members with a support for said material therebetween.

41. Crease-forming and applicating means for use in producing a marginal crease in a collar blank or the like and in applying a material to the collar blank to determine the fold line, said means comprising a member presenting a crease-forming edge corresponding in contour with a line within and adjacent the margin of a collar blank and locating means within said crease-forming edge in laterally fixed spaced relation to said crease-forming edge and arranged for locating the application of said material to a collar blank in contact with said crease-forming edge in predetermined location with respect thereto.

42. Crease-forming and applicating means according to claim 41 wherein said locating means is normally disposed relative to said crease-forming edge for initial contact with the collar blank and is resiliently mounted to permit retraction thereof in bringing said crease-forming edge into pressure contact with the collar blank.

43. Crease-forming and applicating means according to claim 41 wherein said locating means comprises a stencil member having an aperture therein for application of said material therethrough, at least one margin of which is disposed substantially along the fold line of the collar blank in predetermined spaced relationship to said crease-forming edge.

44. Crease-forming and applicating means according to claim 41 wherein said locating means comprises an elongated support for a preformed strip of material, said support being bordered by channels each of which is undercut on the side thereof remote from said support for retaining in said channels the marginal edges of said strip of material with one edge of said strip of material disposed substantially along the fold line of the collar blank in predetermined spaced relation to said crease-forming edge.

45. Crease-forming and applicating means according to claim 41 which also comprises gauge means surrounding said crease-forming edge and arranged to initially position a collar blank in substantial registration with said crease-forming edge.

46. Apparatus for forming a marginal crease in a collar blank and for applying material to the collar blank to determine the fold line thereof, said apparatus comprising in combination a crease-forming die adapted to form a marginal crease in a collar blank, applicator means adapted for application of said material to the collar blank, a support for supporting the collar blank, gauge means associated with the support adapted to determine the location of a collar blank resting on the support, means for elevating and lowering said crease-forming die and said applicator means into operative relation with a collar blank resting on said support, said crease-forming die and said applicator means being in spaced-apart relation when in said operative position, and means for moving said support with said collar blank resting thereon in the location determined by said gauge means into successive positions at which said crease-forming die and said applicator means respectively are in operative position to form a crease adjacent the margin of the collar blank and to apply said material to the collar blank with at least one margin of said material substantially along the fold line of the collar blank in predetermined accurately spaced relationship to said crease.

47. Apparatus according to claim 46 wherein said support is a rotatably mounted table.

48. Apparatus according to claim 46 wherein said support is a rotatably mounted table carrying at least two locating gauges disposed substantially 180° about the axis of rotation of the table and which comprises restraining means for restraining rotation of said table in position for registration of said gauges with said creasing die and said applicator.

49. Apparatus for producing a marginal crease in a collar blank comprising a plurality of plies maintained in registration along a margin of the collar blank, said apparatus comprising a creasing die presenting a crease-forming edge corresponding in contour with a line within and adjacent the margin of the collar blank, a member presenting a surface composed of yieldable resilient material adapted for the pressing of the collar blank thereagainst, said creasing die and said member being constructed and arranged for separating said surface and said crease-forming edge and for bringing together said surface and said crease-forming edge to press a collar blank therebetween, a template which is adapted for internally gauging the assembly, mounting means for said template constructed and arranged for moving said template into registered position at which a collar blank carried thereby is located for registration with said crease-forming edge and for moving said template away from said registered position, and means for maintaining a collar blank in said registered position upon moving said template away from said position with withdrawal of said template from said blank.

50. Apparatus according to claim 49 which also comprises an applicator disposed within said crease-forming edge which is adapted to carry a foldline-forming material and which is constructed and arranged to press said fold line-forming material against said collar blank when said creasing die and said member are brought together to press the collar blank between said crease-forming edge and said surface, and means for heating the collar blank while under pressure between said crease-forming edge and said surface.

51. Apparatus according to claim 49 wherein said crease-forming die is disposed with said crease-forming edge upwardly directed and wherein said mounting means for said template is constructed and arranged for moving said template laterally relative to said creasing die between two positions one of which is adjacent said creasing die and the other of which is substantially spaced therefrom, said template when in said position adjacent said creasing die being movable to deposit a collar blank carried thereby on said crease-forming edge in registered location relative thereto gauged by said template.

52. Apparatus according to claim 49 wherein said crease-forming die is disposed with said crease-forming edge upwardly directed and wherein said mounting means for said template is constructed and arranged for moving said template laterally relative to said creasing die between two positions one of which is adjacent said creasing die and the other of which is substantially spaced therefrom, there being stop means directly interposed between said template and creasing die adapted to limit the movement of said template when moved into position adjacent said creasing die, and said template when in said position adjacent said creasing die being movable to deposit a collar blank carried thereby on said crease-forming edge in registered location relative thereto gauged by said template.

53. Apparatus according to claim 49 wherein a portion of said crease-forming edge is adapted to form a crease in at least one end of the foldover portion of a collar blank and wherein said mounting means for said template is constructed and arranged for the withdrawal of said template from a collar blank in registration with said crease-forming die substantially in the direction of said portion of said crease-forming edge.

54. In a method of making a collar or the like having a fold-over portion and a band portion from a plurality of cut collar plies wherein said plies are stitched together along the margin of said fold-over portion and said plies are marginally folded under along the margin of said fold-over portion with the fold edge of the marginally folded under plies determining the contour of the fold-over portion of the finished collar, the steps comprising predetermining the marginal contour of the fold-over portion of the finished collar by mechanically forming a marginal crease in at least one of said plies that determines said fold edge of said plies along the margin of the fold-over portion of the finished collar and applying to one of said plies in predetermined gauged relation with respect to said crease a foldline forming material that provides in the finished collar discontinuity of stiffness along the foldline between the fold-over and band portions of the collar thereby positioning said foldline in accurate and predetermined spaced relation with respect to the marginal contours of the fold-over portion in the finished collar.

BENJAMIN LIEBOWITZ.

No references cited.